United States Patent
Fejzo

(10) Patent No.: US 9,984,692 B2
(45) Date of Patent: May 29, 2018

(54) POST-ENCODING BITRATE REDUCTION OF MULTIPLE OBJECT AUDIO

(71) Applicant: DTS, Inc., Calabasas, CA (US)

(72) Inventor: Zoran Fejzo, Los Angeles, CA (US)

(73) Assignee: DTS, INC., Calabasas, CA (US)

( * ) Notice: Subject to any disclaimer, the term of this patent is extended or adjusted under 35 U.S.C. 154(b) by 0 days. days.

(21) Appl. No.: 14/970,320

(22) Filed: Dec. 15, 2015

(65) Prior Publication Data

US 2016/0099000 A1     Apr. 7, 2016

Related U.S. Application Data

(62) Division of application No. 14/199,706, filed on Mar. 6, 2014.

(51) Int. Cl.
*G10L 19/00* (2013.01)
*G10L 19/002* (2013.01)
(Continued)

(52) U.S. Cl.
CPC .......... *G10L 19/002* (2013.01); *G10L 19/008* (2013.01); *G10L 19/24* (2013.01);
(Continued)

(58) Field of Classification Search
CPC ... G10L 19/24; G10L 19/002; H04N 21/2662; H04N 21/2343; H04N 21/234363; H04N 21/24; H04N 21/2402; H04N 21/25833
See application file for complete search history.

(56) References Cited

U.S. PATENT DOCUMENTS 4,703,480 A * 10/1987 Westall ............... H04M 11/064
                                                    370/523
5,621,856 A * 4/1997 Akagiri .................. H04B 1/665
                                                    704/200.1

(Continued)

OTHER PUBLICATIONS

Emmanuel Gallo, Guillaume Lemaitre and Nicolas Tsingos, "Prioritizing Signals for Selective Real-Time Audio Processing." Proceedings of ICAD 05-Eleventh Meeting of the International Conference on Auditory Display; Jul. 6-9, 2005; Limerick, Ireland.
(Continued)

*Primary Examiner* — Richard Zhu
(74) *Attorney, Agent, or Firm* — Craig S. Fischer

(57) ABSTRACT

A post-encoding bitrate reduction system and method for generating one more scaled compressed bitstreams from a single encoded plenary file. The plenary file contains multiple audio object files that were encoded separately using a scalable encoding process having fine-grained scalability. Activity in the data frames of the encoded audio object files at a time period are compared with each other to obtain a data frame activity comparison. Bits from an available bitpool are assigned to all of the data frames based on the data frame activity comparison and corresponding hierarchical metadata. The plenary file is scaled down by truncating bits in the data frames to conform to the bit allocation. In some embodiments frame activity is compared to a silence threshold and the data frame contains silence if the frame activity is less than or equal to the threshold and minimal bits are used to represent the silent frame.

13 Claims, 13 Drawing Sheets

(51) Int. Cl.
*G10L 19/008* (2013.01)
*H04N 19/40* (2014.01)
*G10L 19/24* (2013.01)
*H04N 19/132* (2014.01)
*H04N 21/2662* (2011.01)
*H04N 21/434* (2011.01)

(52) U.S. Cl.
CPC .......... *H04N 19/40* (2014.11); *H04N 19/132* (2014.11); *H04N 21/2662* (2013.01); *H04N 21/434* (2013.01)

(56) References Cited

U.S. PATENT DOCUMENTS

| | | | |
|---|---|---|---|
| 5,742,734 A | 4/1998 | DeJaco et al. | |
| 5,742,930 A | 4/1998 | Howitt et al. | |
| 6,044,089 A * | 3/2000 | Ferriere | H04L 29/06 348/E5.008 |
| 6,349,286 B2 | 2/2002 | Shaffer et al. | |
| 6,473,731 B2 * | 10/2002 | Hinderks | H04B 1/665 704/200.1 |
| 6,487,535 B1 * | 11/2002 | Smyth | G10L 19/0208 704/201 |
| 6,694,293 B2 | 2/2004 | Benyassine et al. | |
| 6,697,776 B1 | 2/2004 | Fayad et al. | |
| 6,775,325 B1 * | 8/2004 | Florencio | H04N 19/40 375/240.03 |
| 7,003,449 B1 * | 2/2006 | Absar | G10L 19/002 704/200.1 |
| 7,057,535 B2 * | 6/2006 | Apostolopoulos | H04N 21/235 341/50 |
| 7,313,520 B2 | 12/2007 | Plummer | |
| 7,333,929 B1 * | 2/2008 | Chmounk | G10L 19/24 704/200 |
| 7,398,204 B2 * | 7/2008 | Najaf-Zadeh | G10L 19/032 704/200.1 |
| 7,548,853 B2 | 6/2009 | Shmunk et al. | |
| 7,835,915 B2 * | 11/2010 | Kim | G10L 19/24 704/500 |
| 8,239,210 B2 * | 8/2012 | Fejzo | G10L 19/0017 704/503 |
| 8,244,895 B2 * | 8/2012 | Mukherjee | H04L 29/06027 709/227 |
| 8,370,514 B2 * | 2/2013 | Hurst | H04N 7/17336 709/231 |
| 8,694,325 B2 | 4/2014 | Lin | |
| 8,731,949 B2 * | 5/2014 | Jiang | H03M 7/3082 704/226 |
| 2002/0131496 A1 * | 9/2002 | Vasudevan | H04N 21/2402 375/240.11 |
| 2007/0140499 A1 | 6/2007 | Davis | |
| 2007/0198551 A1 | 8/2007 | Barnes et al. | |
| 2008/0215317 A1 | 9/2008 | Fejzo | |
| 2009/0099851 A1 | 4/2009 | Pilati et al. | |
| 2009/0164224 A1 | 6/2009 | Fejzo | |
| 2009/0210436 A1 | 8/2009 | Tirpak | |
| 2011/0106546 A1 | 5/2011 | Fejzo | |
| 2011/0200198 A1 | 8/2011 | Grill et al. | |
| 2014/0358554 A1 * | 12/2014 | Riedmiller | G10L 19/167 704/500 |

OTHER PUBLICATIONS

Frode Eika Sandnes, "Efficiant Large-scale Multichannel Audio Coding," Euromicro Conference 2001. Proceedings 27th, Sep. 4-6, 2001, Dept. Computer Science, Faculty of Engineering Oslo University college, Cort Adelers gate 30, Norway.

International Search Report and Written Opinion in related PCT Application No. PCT/US2015/017732, dated Jun. 10, 2015, 13 pages.

* cited by examiner

POST-ENCODING BITRATE REDUCTION OF MULTIPLE OBJECT AUDIO

BACKGROUND

Audio compression techniques minimize the number of digital bits used to create a representation of an input audio signal. Uncompressed high-quality digital audio signals often contain large amounts of data. The sheer size of these uncompressed signals often makes them undesirable or unsuitable for storage and transmission.

Compression techniques may be used to reduce the file size of digital signals. These compression techniques reduce the digital storage space necessary to store the audio signal for future playback or transmission. Moreover, these techniques can be used to generate a faithful representation of the audio signal at a reduced file size. This low-bitrate version of the audio signal can then be transmitted at a low bitrate over a network channel of limited bandwidth. This compressed version of the audio signal is decompressed after transmission to reconstruct a sonically-acceptable representation of the input audio signal.

As a general rule, the quality of the reconstructed audio signal is inversely proportional to the number of bits used to encode the input audio signal. In other words, the fewer bits used to encode the audio signal the greater the difference between the reconstructed audio signal and the input audio signal. Traditional audio compression techniques fix the bitrate, and thus the level of audio quality, at the time of compression encoding. The bitrate is the number of bits used to encode the input audio signal per time period. No further reduction in the bitrate can be effectuated without either recoding the input audio signal at a lower bitrate or decompressing the compressed audio signal and then recompressing the decompressed signal at a lower bitrate. These traditional techniques are not "scalable" to address the situations where different applications require bitstreams encoded at different bitrates.

One technique used to create a scalable bitstream is difference coding. Difference coding encodes the input audio signal as a high-bitrate bitstream composed of subsets of low-bitrate bitstream. The low-bitrate bitstreams then are used to construct the higher-bitrate bitstreams. Difference coding requires extensive analysis of the bitstream being scaled and is computationally intensive. This computational intensity requires significant processing power to attain real-time performance.

Another scalable coding technique uses a plurality of compression methods to create a layered scalable bitstream. This approach uses a hybrid of compression techniques to cover the desired range of scalable bitrates. However, limited scalability range and limited resolution make this layered approach unsuitable for many types of applications. For these reasons, the desirable scenario of storing a single compressed audio bitstream and delivering content from this single bitstream at different bitrates is often difficult to achieve.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments of the post-encoding bitrate reduction system and method produce one or more scaled compressed bitstreams from a single plenary file. The plenary file contains multiple audio object files that have been separately encoded previously. Thus, the processing of the plenary file is performed after the audio object files have been encoded using the scalability feature of the plenary file.

The encoding process for each encoded audio file is scalable such that bits can be truncated from frames of the encoded audio files to reduce the file size. This scalability allows data to be encoded at a particular bitrate and then any percentage of the encoded data can be cut off or dropped while still retaining the ability to decode the encoded data properly. For example, if data is encoded at bitrate Z, then half the frame can be cut off or dropped to obtain half the bitrate (Z/2) and still be able to decode properly.

One instance where this fine-grained scalability and working from the single encoded plenary file is valuable is when streaming to different bandwidth devices. For example, if there are multiple audio object files sitting located on a server, embodiments of the system and method will separately encode these audio object files at some high bitrate that the content provider wants to achieve. But if this content is streamed to different and lower bandwidth devices, such as cell phones, automobile, televisions, and so forth, then the bitrate needs to be reduced. While working from a single encoded plenary file embodiments of the system and method allow the bitrate to be adjusted for each individual device's bitrate. Thus, each delivery is tailored differently. but the single file is used to deliver different bitrate bitstreams. Moreover, there is no need to re-encode the encoded audio object files.

Instead of re-encoding the audio object files, embodiments of the system and method process a single version of the encoded plenary file and then scale down the bitrate. Moreover, the scaling of the bitrate is done without the need to first decode the plenary file back to its uncompressed form and then re-encode the resulting uncompressed data at a different bitrate. All this can be achieved without the need to re-encode the encoded audio object files.

Encoding and compression are an expensive computationally demanding process while the post-encoded bit-rate scaling of embodiments of the system and method is very lightweight process. This means that embodiments of the system and method impose much smaller server requirements when compared to existing systems and method that perform simultaneous multiple encodes to service each different channel bitrate.

Embodiments of the system and method produce a scaled compressed bitstream from a single plenary file. The plenary file at a plenary bitrate is created by combining a plurality of separately encoded audio object files. An audio object is a source signal of a particular sound or combination of sounds. In some embodiments the plenary file includes hierarchical metadata corresponding to the encoded audio object files. The hierarchical metadata contains priority information for each encoded audio object file in relation to other encoded audio object files. For example, a dialog audio object in a movie soundtrack may be weighted more heavily than a street noise audio object (during the same time period). In some embodiments the entire temporal length of each encoded audio object file is used in the plenary file. This means that even if an encoded audio object file contains silent periods they are still included in the plenary file.

Each of the audio object files are segmented into data frames. A time period is selected, and the data frame activity of the data frames of each of the encoded audio files at that specified time period are compared to each other. This gives a data frame activity comparison for all the encoded audio files at the selected time period. Bits then are assigned from an available bitpool to each of the data frames of the encoded audio object files during the selected time period based on the data frame activity comparison and in some cases the hierarchical metadata. This yields a bit allocation for the selected time period. In some embodiments the hierarchical metadata contains an encoded audio object file priority such that the files are ranked in order of priority or importance to a user. It should be noted that bits from the available bitpool are assigned to all of the data frames and all of the encoded audio object files for the selected time period. In other words, at a given time period, each and every audio object file and frame therein receives bits, but some files receive more bits than others based on their frame activity and other factors.

Measuring data frame activity can be based on any number of parameters available in encoded bitstreams. For example, audio level, video activity, and other measures of frame activity can be used to measure the data frame activity. Moreover, in some embodiments of the system and method, data frame activity is measured on the encoder side and embedded in the bitstream, such as one number per frame. In other embodiments the decoded frames may be analyzed for frame activity.

In some embodiments, the data frame activity is compared between frames. Often during a time period, there will be more activity present in some data frames while others data frames will have less activity. The data frame comparison includes selecting a time period and then measuring data frame activity within data frames during the time period. The frames of each of the encoded audio objects are examined during the selected time period. The data frame activity in each of the data frames then is compared to other frames to obtain the data frame activity comparison. This comparison is a measure of the activity of a particular data frame relative to other data frames during the time period.

Embodiments of the system and method then scale down the plenary file by truncating bits of the data frames in accordance with the bit allocation to generate pared-down frames. This bit truncation uses the scalability of the plenary file and truncates bits in a data frame in a reverse ranking order. This yields a number of bits allocated to the data frame in the bit allocation such that the lower-ranked bits are truncated before the higher-ranked bits. In some embodiments, the scalability of the frames within the encoded audio object files includes extracting tones from a frequency domain representation of an audio object file to obtain a time domain residual signal representing the audio object file with at least some tone removed. The extracted tones and the time domain residual signal are formatted into a plurality of data chunks, where each data chunk comprising a multiple bytes of data. Both the data chunks in data frames of the encoded audio object file and the bits in the data chunks are ordered in order of psychoacoustic importance to obtain the ranking order from most important bit to least important bit.

Bit-reduced encoded audio object files are obtained from the pared-down frames. The bit-reduced encoded audio object files then are multiplexed together and packed into the scaled compressed bitstream such that the scaled compressed bitstream has a target bitrate that is lower than or equal to the plenary bitrate in order to facilitate post-encoding bitrate reduction of the single plenary file.

The measured data frame activity for each data frame at the selected time period is compared to a silence threshold to determine whether there is a minimal amount of activity in any of the data frames. If the data frame activity of a particular data frame is less than or equal to the silence threshold, then that data frame is designated as a silent data frame. Moreover, the number of bits used to represent that data frame is retained without any reduction in bits. On the other hand, if the data frame activity of a particular data frame is greater than the silence threshold, then storing the data frame activity in a frame activity buffer. The available bitpool for the selected time period is determined by subtracting bits used by silent data frames during the selected time period from a number of bits assigned to the selected time period.

In some embodiments the scaled compressed bitstream is transmitted over a network channel at a bitrate that is less than or equal to the target bitrate. The bitstream is received by a receiving device and then decompressed to obtain decoded audio object files. In some scenarios the decoded audio object files are mixed to create an audio objects mix. A user can manually or automatically mix the decoded audio objects to create an audio objects mix. In addition, the encoded audio object files in the hierarchical metadata may be prioritized based on a spatial positioning in an audio object mix. Moreover, two or more of the decoded audio object files may be dependent on each other for spatial masking based on their position in the mix.

Embodiments of the system and method may also be used to obtain multiple scaled compressed bitstreams from a single plenary file. This is done by separately encoding a plurality of audio object files to obtain a plurality of encoded audio object files at a plenary bitrate using a scalable bitstream encoder having fine-grained scalability. This fine-grained scalability feature ranks bits in each data frame of the encoded audio object files in an order of psychoacoustic importance to human hearing. The plenary file is generated by combining the plurality of independently encoded audio object files and corresponding hierarchical metadata. Each of the plurality of encoded audio object files is persistent and present for the entire duration of the plenary file.

A first scaled compressed bitstream at a first target bitrate is constructed from the plenary file as well as a second scaled compressed bitstream at a second target bitrate. This yields multiple scaled bitstreams at different target bitrates from the single plenary file without any re-encoding of the plurality of encoded audio object files. Moreover, the first target bitrate and the second target bitrate are different from each other and are both less than the plenary bitrate. The first target bitrate is a maximum bitrate at which the first scaled compressed bitstream will be transmitted over a network channel.

As noted above, the data frame activity of data frames of each of the plurality of encoded audio files at a selected time period are compared to each other to obtain a data frame activity comparison. This data frame activity comparison and the first target bitrate are used to assign bits to each of the data frames of the encoded audio object files at the selected time period based to obtain a bit allocation for the selected time period. The plenary filed is scaled down by truncating bits of the data frames in accordance with the bit allocation to achieve the first target bitrate and obtain bit-reduced encoded audio object files. These bit-reduced encoded audio object files are multiplexed together and the bit-reduced audio object files are packed into the first scaled compressed bitstream at the first target bitrate. The first scaled compressed bitstream is transmitted to a receiving device at the first target bitrate and decoded to obtain decoded audio objects. These decoded audio objects are mixed to create an audio objects mix.

It should be noted that alternative embodiments are possible, and steps and elements discussed herein may be changed, added, or eliminated, depending on the particular embodiment. These alternative embodiments include alternative steps and alternative elements that may be used, and structural changes that may be made, without departing from the scope of the invention.

DRAWINGS DESCRIPTION

Referring now to the drawings in which like reference numbers represent corresponding parts throughout:

DETAILED DESCRIPTION

Figure 1:
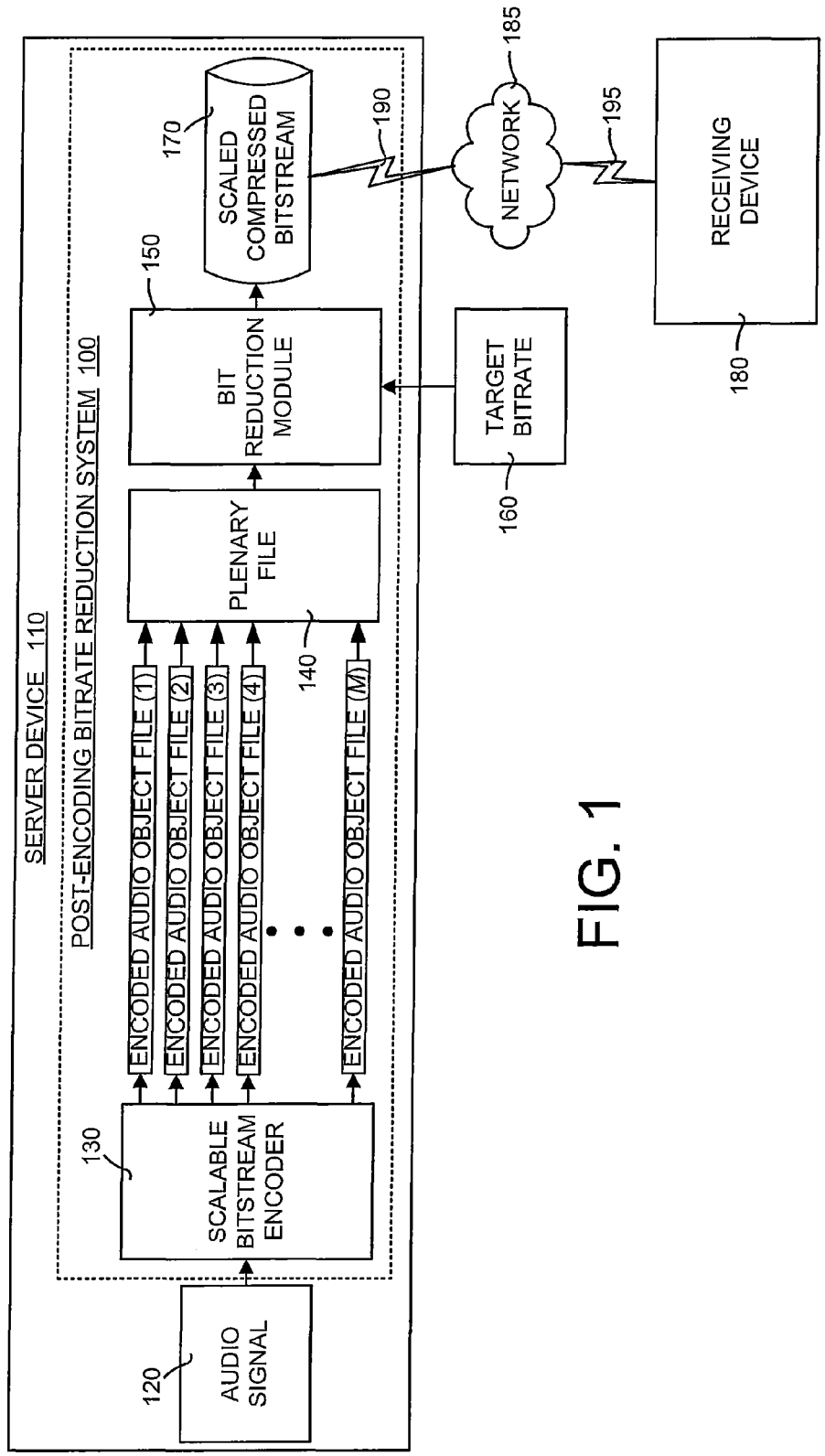
FIG. 1 is a block diagram illustrating a general overview of embodiments of the post-encoding bitrate reduction system and method.

In the following description of embodiments of a post-encoding bitrate reduction system and method reference is made to the accompanying drawings. These drawings shown by way of illustration specific examples of how embodiments of the post-encoding bitrate reduction system and method may be practiced. It is understood that other embodiments may be utilized and structural changes may be made without departing from the scope of the claimed subject matter.

I. Introduction

An audio object is a source signal of a particular sound or combination of sounds. In some situations the audio object also includes its associated rendering metadata. The rendering metadata is data accompanying the audio object that dictates how the audio object should be rendered in audio space during playback. This metadata can include multi-dimensional audio space information, positional information in space, and surround placement information.

An audio object can represent various types of sound sources, such as individual musical instruments and vocals. Moreover, audio objects may include audio stems, which are sometimes referred to as submixes, subgroups, or busses. An audio stem also can be a single track containing a grouping of audio content, such as a string section, a horn section, or street noise.

In a traditional audio content production environment the audio objects are recorded. A professional audio engineer then mixes the audio objects into a final master mix. The resultant mix then is delivered to an end user for playback. In general, this mix of the audio objects is final and the end user is virtually unable to make changes to the mix.

In contrast to traditional audio content production, multiple-object audio (or "multi-object audio") allows an end user to mix the audio objects after delivery. One way to control and specify this post-delivery mixing in a particular or suggested manner is by using embedded metadata transmitted with the audio content. Another way is by providing user controls that allow the end user to directly process and mix the audio objects. Multi-object audio allows the end user to create distinctive and highly-personalized audio presentations.

Multi-object audio can be stored as a file on a storage device and then transmitted in a bitstream upon request. The audio bitstream can be compressed or encoded to reduce the bitrate needed to transmit the bitstream and the storage space needed to store the file. In general, by way of explanation and not limitation, compression of a bitstream means that less information is used to represent a bitstream. On the other hand, encoding of the bitstream means that the bitstream is represented in another form, such as using symbols. However, encoding does not always compress the bitstream.

The encoded bitstream is transmitted over a finite-bandwidth network channel. Embodiments of the post-encoding bitrate reduction system and method take separately encoded audio objects and combine them with each other and additional data to generate an encoded bitstream. When separately encoded audio objects are transmitted, the bandwidth of the encoded bitstream containing the encoded audio objects can often exceed the capacity of the network channel. In such cases, a bitstream having a lower bitrate that is unsuitable for a particular application may be transmitted over the network channel. This can result in a reduced quality of received audio data.

This degradation in quality is particularly problematic when multiple streams of audio data (such as multiple audio objects) are multiplexed for simultaneous or nearly simultaneous transmission over a common network channel. This because in some instances the bandwidth of each encoded audio object is degraded proportionally, which may not take into account the relative content of each audio object or groups of audio objects. For example, one audio object may contain music while another may contain street noise. Proportionally degrading the bandwidth of each audio object will likely have a more deleterious effect on the music data than on the noise data.

There may be times when the encoded bitstream is transmitted over a network channel at a particular bitrate and the channel conditions will change. For example, the bandwidth of the channel may become constricted and require a lower transmission bitrate. In these situations, embodiments of the post-encoding bitrate reduction system and method can react to this change in network conditions by adjusting the scaling of the encoded bitstream bitrate. For example, when the bandwidth of the network channel becomes limited the bitrate of the encoded bitstream drops so that the transmission over the network channel can continue. Instead of re-encoding the audio objects, embodiments of the system and method process a single version of the encoded bitstream and then scale down the bitrate. The resultant scaled bitstream then may be transmitted over the network channel at the reduced bitrate.

The scenario may arise where it is desirable to transmit the single encoded bitstream at different bitrates over a variety of network channels. This may occur, for example, when each of the network channels has a different capacities and bandwidths or when the bitstream is being received by devices having different capabilities. In this situation embodiments of the system and method alleviate the need to individually encode or compress for each channel. Instead, a single version of the encoded bitstream is used and the scaling of the bitrate is adjusted in response to each channel's capacity.

The encoded bitstream can be processed in real time or substantially real time. Substantially real time can occur, for example, without having access to entire audio file or program, such as during a broadcast of a live sporting event. In addition, the audio data can be processed offline and played back in real time. This occurs when there is access to the entire audio file or program, such as with video-on-demand application. In the case of an encoded audio bitstream it can include multiple audio objects, some or all of which comprise sound information and associated metadata. This metadata can include, but is not limited to, positional information, which includes position in space, velocity, trajectory, etc., sonic characteristics, which include divergence, radiation parameters, and the like.

Each audio object or group of audio objects can be separately encoded using identical or different encoding techniques. The encoding may be performed on frames or blocks of the bitstream. A "frame" is a discrete segment of data in time that is used in the compression and coding of audio signals. These data frames can be placed in a serial sequence one after another (like a filmstrip) to create a compressed audio bitstream. Each frame is a fixed size and represents a constant time interval containing. The frame size is dependent on the Pulse Code Modulation (PCM) sample rate and the coded bitrate.

Each frame of data typically is preceded by a header that contains information about the data to follow. The header may be followed by error detection and correction data, while the remainder of the frame contains the audio data. The audio data includes PCM data and amplitude (loudness) information at a particular point in time. To produce intelligible sound, tens of thousands of frames are played in sequence to produce frequencies.

Depending on the goals of a particular application, different frames (such as frames of the same object but occurring at different times) may be encoded using different bit rates based, for example, on the audio content of the frames. This approach is referred to as variable bitrate (VBR) coding as the size of encoded data varies over time. Such an approach can provide flexibility and improve quality-to-bandwidth ratio of the encoded data. Alternatively, frames may be encoded using the same bitrate. This approach is referred to as constant bit rate (CBR) coding as the size of encoded data is constant over time.

While it is possible to transmit the audio objects independently in an unencoded and uncompressed manner in order to maintain separation, this is usually not feasible because of the large bandwidth requirements typically required to send a usually large file. Thus, some form of audio compression and encoding frequently is used to facilitate economical delivery of the multi-object audio to the end user. It has been found that encoding an audio signal containing audio objects to reduce its bitrate while still maintaining adequate acoustical separation between the audio objects is difficult.

For example, some existing audio compression techniques for multiple audio objects are based on a dependency of the objects. In particular, joint encoding techniques frequently use a dependency of the audio objects based on factors such as location, spatial masking, and frequency masking. One challenge, however, with these joint encoding techniques is that it is difficult to predict the spatial and frequency masking between objects if their placement is not known prior to delivery.

Another type of existing audio compression technique is discrete object-based audio scene coding that typically requires a computationally expensive decoding and rendering system as well as a high transmission or data storage rate for carrying separately the multiple audio objects. Another type of encoding technique for delivering multi-object audio is multi-channel spatial audio coding. Unlike the discrete object-based audio scene coding technique, however, this spatial audio coding approach does not define separable audio objects. Consequently, the spatial audio decoder is not able to separate the contributions of each audio object in the downmix audio signal.

Yet another technique for coding multiple audio objects is Spatial Audio Object coding (SAOC). However, the SAOC technique cannot fully separate the audio objects in the downmix signal that are concurrent in the time-frequency domain. Consequently, extensive amplification or attenuation, as may be required by interactive user controls, of an object by an SAOC decoder may cause a noticeable deterioration in the audio quality of a reproduced scene.

It should be noted that for pedagogical purposes and ease of illustration, this document primarily refers to use of audio data. However, the features described herein may also be applied to other forms of data, including video data and data containing time-series signals such as seismic and medical data. In addition, the features described herein may also be applied to virtually any type of manipulation of data, such as the storage of data and the transmission of data.

II. System Overview

Embodiments of the post-encoding bitrate reduction system and method separately and independently encode multiple audio object files at some plenary bitrate. Embodiments of the system and method then combine these encoded audio object files along with their associated hierarchical metadata to generate a plenary file. Multiple bitstreams may be obtained from the single plenary file. These multiple bitstreams are at target bitrates that are less than or equal to the plenary bitrate. This bitrate alteration, which is known as scaling, ensures that optimal quality is maintained at each scaled bitrate. Moreover, the scaling of the bitrate is achieved without the need to first decode the plenary file back to its uncompressed form and then re-encode the resulting uncompressed data at a different bitrate.

As explained in detail below, this scaling is achieved in part as follows. First, the audio object files are separately encoded using a scalable bitstream encoder that orders the bits in each frame based on psychoacoustic importance. This scalable encoding also provides for bitrate alteration in a fine-scale manner by removing bits within a frame. Second, at each frame time interval the corresponding frame activity within each of the object files is considered. Then, based on the relative relations between these frame activity measures, embodiments of the system and method decide which frame payload of each compressed object file is retained. In other words, each frame payload of an audio object file is scaled based on its measured multimedia frame activity and its relationship to all frame activities in all other audio object files that are to be multiplexed together.

FIG. 1 is a block diagram illustrating a general overview of embodiments of the post-encoding bitrate reduction system 100. The system 100 is located on a server computing device 110. Embodiments of the system 100 receive as input an audio signal 120. The audio signal 120 can contain various types of content in a variety of forms and types. Moreover, the audio signal 120 may be in an analog, digital or other form. Its type may be a signal that occurs in repetitive discrete amounts, in a continuous stream or some other type. The content of the input signal may be virtually anything, including audio data, video data, or both. In some embodiments the audio signal 120 contains a plurality of audio object files.

Embodiments of the system 100 include a scalable bitstream encoder 130 that individually encodes each of the audio object files contained in the audio signal 120. It should be noted that the scalable bitstream encoder 130 may be multiple encoders. As shown in FIG. 1, the output from the scalable bitstream encoder 130 is M number of independently encoded audio object files, including encoded audio object file (1) to encoded audio object file (M), where M is a nonzero, positive integer. The encoded audio object files (1) to (M) are combined with associated hierarchical metadata to obtain a plenary file 140.

Whenever a bitstream having a certain target bitrate 160 is desired, the plenary file 140 is processed by a bit reduction module 150 to produce the desired bitstream. The bit reduction module 150 processes the plenary file 140 to produce a scaled compressed bitstream 170 having bitrate less than or equal to the target bitrate 160. Once the scaled compressed bitstream 170 is generated then it may be sent to a receiving device 180. The server computing device 110 communicates with other devices (such as the receiving device 180) over a network 185. The server computing device 110 accesses the network 185 using a first communications link 190 and the receiving device 180 accesses the network 185 using a second communications link 195. In this manner the scaled compressed bitstream 170 can be requested by and sent to the receiving device 180.

In the embodiments shown in FIG. 1, a network channel includes the first communications link 190, the network 185, and the second communications link 195. The network channel has some maximum bandwidth, which is communicated to the bit reduction module as the target bitrate 160. The scaled compressed bitstream 170 is transmitted over the network channel at or below the target bitrate such that the maximum bandwidth of the channel is not exceeded.

Figure 2:
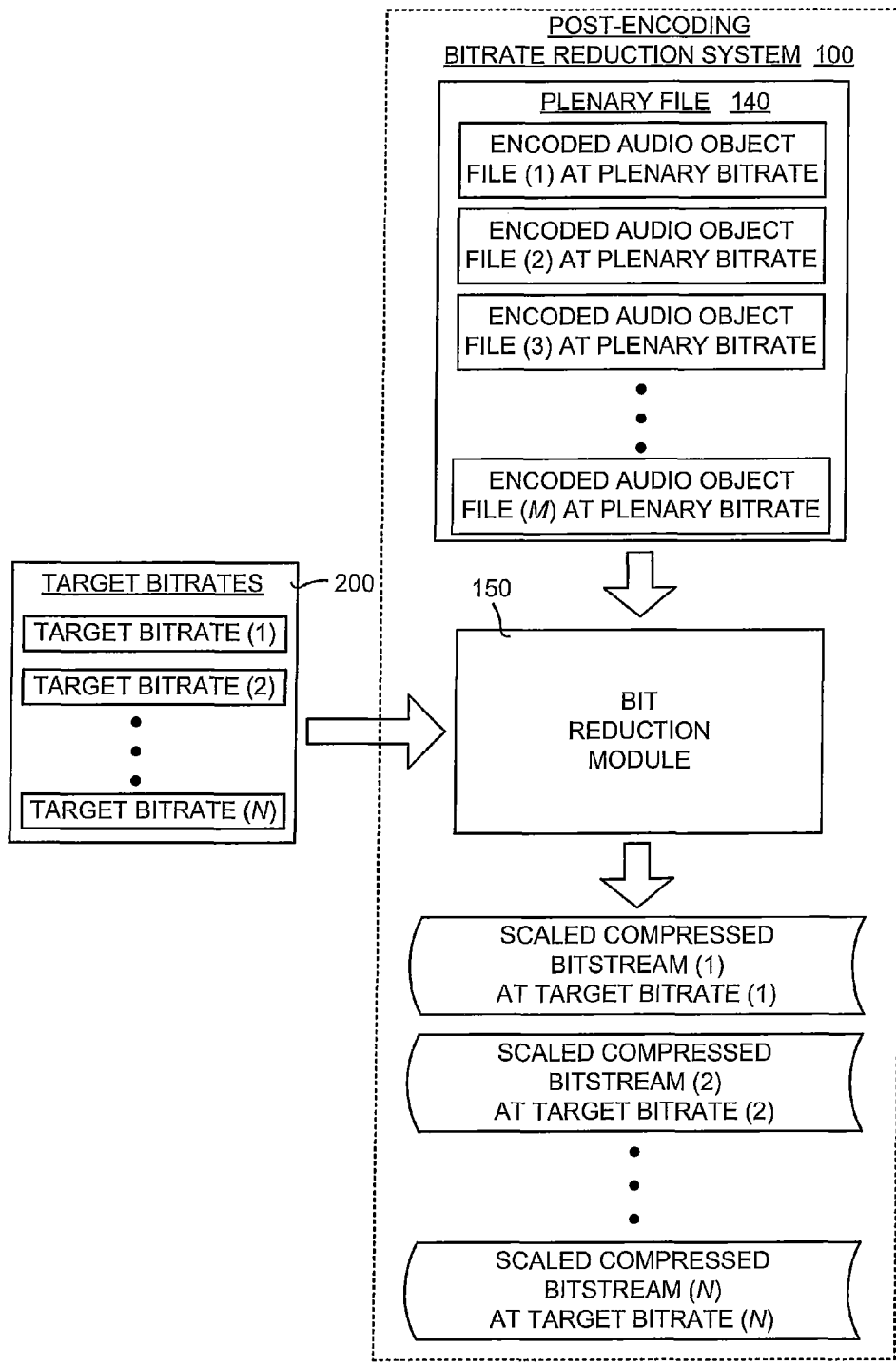
FIG. 2 is a block diagram illustrating a general overview of embodiments of the post-encoding bitrate reduction system obtaining multiple scaled compressed bitstreams from a single plenary file.

As stated above, in some situations it is desirable to transmit the single plenary file at different bitrates over a plurality of network channels having a variety of capabilities. FIG. 2 is a block diagram illustrating a general overview of embodiments of the post-encoding bitrate reduction system 100 obtaining multiple scaled compressed bitstreams from the single plenary file 140. As shown in FIG. 2, the plenary file 140 contains M number of encoded audio object files at some plenary bitrate. Specifically, FIG. 2 illustrates an encoded audio object file (1) at the plenary bitrate, an encoded audio object file (2) at the plenary bitrate, an encoded audio object file (3) at the plenary bitrate, and any additional encoded audio object files (as indicated by the ellipsis) including an encoded audio object file (M) at the plenary bitrate.

Encoded audio object file (1) to encoded audio object file (M) are independently encoded by the scalable bitstream encoder 130 at the plenary bitrate. The plenary bitrate is higher than the target bitrate 160. Typically the target bitrate 160 is the bitrate used to transmit the content over a network channel without exceeding the available bandwidth of the channel.

In some embodiments the plenary file 140 uses a high bitrate to encode the M independently encoded audio object files such that the size of the plenary file 140 is quite large. This can be problematic if the content of the plenary file 140 is to be transmitted over a network channel having limited bandwidth. As explained in detail below, in order to mitigate the difficulties associated with sending a large size file (such as the plenary file 140) over the limited bandwidth channel, the encoded audio object files (1) to (M) are processed by the bit reduction module 150 to create a plurality of scaled encoded bitstreams from the single plenary file 140. This is achieved in part by removing chunks of ordered data in the data frames based on a bit allocation.

Although a single target bitrate 160 is shown in FIG. 1, in some scenarios there may be a plurality of target bitrates. For example, it may be desirable to transmit the plenary file 140 over various network channels each having different bitrates. As shown in FIG. 2, there are N number of target bitrates 200, where N is a positive, non-zero integer. The target bitrates 200 include a target bitrate (1), a target bitrate (2), and so forth, up to a target bitrate (N).

The bit reduction module 150 receives the target bitrate 160 in order to scale the bitrate of the plenary file 140 so that the resultant scaled encoded bitstream will best fit a particular limited bandwidth channel. The target bitrates 200 typically are sent from an Internet Service Provider (ISP) to advise embodiments of the system 100 and method of the bandwidth needs and capabilities of the network channels over which the bitstreams will be transmitted. The target bitrates 200 are less than or equal to the plenary bitrate.

In the exemplary embodiment of FIG. 2, the target bitrates 200 include N different target bitrates, where N is a non-zero, positive integer that may be equal to, less than, or greater than M. The target bitrates 200 include a target bitrate (1), a target bitrate (2), in some cases additional target bitrates (as indicated by the ellipsis), and a target bitrate (N). Typically the target bitrates 200 will be different from each other, although they may be similar in some embodiments. Also, it should be noted that each of the target bitrates 200 may be sent together or individually over time.

The scaled compressed bitstreams shown in FIG. 2 correspond to the target bitrates 200. For example, target bitrate (1) is used to create the scaled compressed bitstream (1) at the target bitrate (1), target bitrate (2) is used to create the scaled compressed bitstream (2) at the target bitrate (2), in some cases additional scaled compressed bitstreams at the target bitrates (as shown by the ellipsis), and a scaled encoded file (N), where N is the same non-zero, positive integer as set forth above. In some embodiments the individual target bitrates may be similar or identical, but typically the individual target bitrates are different from each other.

It should be noted that for pedagogical purposes there are a specific number of encoded audio object files, target bitrates, and scaled compressed bitstreams shown in FIG. 2. However, there may be cases where N=1, M=1, and a single scaled compressed bitstream is obtained from the plenary file 140. In other embodiments, N may be a large number where several scaled compressed bitstreams are obtained from the plenary file 140. Moreover, the scaled compressed bitstreams may be created on the fly in response to a request from a client. Alternatively, the scaled compressed bitstreams may be created in advance and stored on storage device.

III. System Details

The system details of components of embodiments of the post-encoding bitrate reduction system 100 will now be discussed. These components include the bit reduction module 150, the scalable bitstream encoder 130, and a frame-by-frame hierarchical bit allocation module. In addition, decoding of the scaled compressed bitstream 170 on the receiving device 180 will be discussed. It should be noted that only a few of the several ways in which the system may be implemented are detailed below. Many variations are possible.

Figure 3:
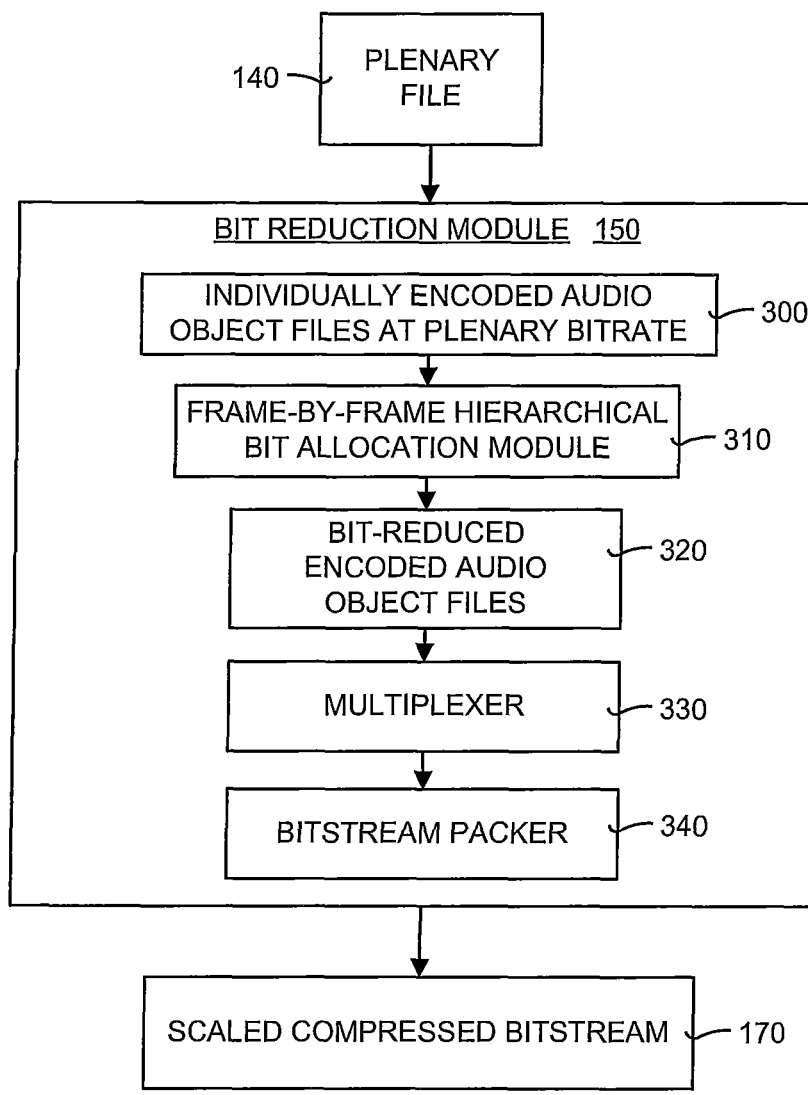
FIG. 3 is a block diagram illustrating details of a first embodiment of the post-encoding bitrate reduction system shown in FIGS. 1 and 2.

FIG. 3 is a block diagram illustrating details of a first embodiment of the post-encoding bitrate reduction system 100 shown in FIGS. 1 and 2. In this particular embodiment, the audio object files have already been independently and separately encoded and are contained in the plenary file 140. The plenary file 140 is input to embodiments of the post-encoding bitrate reduction system 100. The system 100 receives individually encoded audio object files at the plenary bitrate 300 for further processing.

The individually encoded audio object files 300 are processed by the bit reduction module 150. As explained in detail below, the bit reduction module 150 reduces the number of bits used to represent an encoded audio object file in order to achieve the target bitrates 200. The bit reduction module 150 receives the individually encoded audio object files 300 and processes them using the frame-by-frame hierarchical bit allocation module 310. This module 310 reduces the number of bits in each of the frames based on a hierarchical bit allocation scheme. The output of the module 310 is bit-reduced encoded audio object files 320.

A statistical multiplexer 330 takes the bit-reduced encoded audio object files 320 and combines them. In some embodiments the statistical multiplexer 330 allocates channel capacity or bandwidth (measured in number of bits) to each encoded audio object file 1 though M based at least in part on the hierarchical bit allocation scheme. In some embodiments, encoded audio object files are variable bitrate (VBR)-encoded data and the statistical multiplexer 330 outputs constant bitrate (CBR)-encoded data.

In some embodiments, the statistical multiplexer 330 also accounts for other characteristics of the encoded audio object files during bit allocation. For example, the audio content of an encoded audio object file (such as music, speech, noise, and so forth) can be relevant. An encoded audio object file associated with a simple crash (such as noise) may require less bandwidth than an object associated with a music track. As another example, loudness of the objects can be used in bandwidth allocation (such that loud objects may benefit from more bit allocation). As yet another example, frequency of audio data associated with the objects can also be used in bit allocation (such that wideband objects may benefit from more bit allocation).

A bitstream packer 340 then processes the multiplexed bit-reduced encoded audio object files 320 and packs them into frames and containers for transmission. The output of the bitstream packer 340 is the scaled compressed bitstream 170 containing variable-size frame payloads. The scaled compressed bitstream 170 is at a bitrate that is less than or equal to the target bitrate 160.

Figure 4:
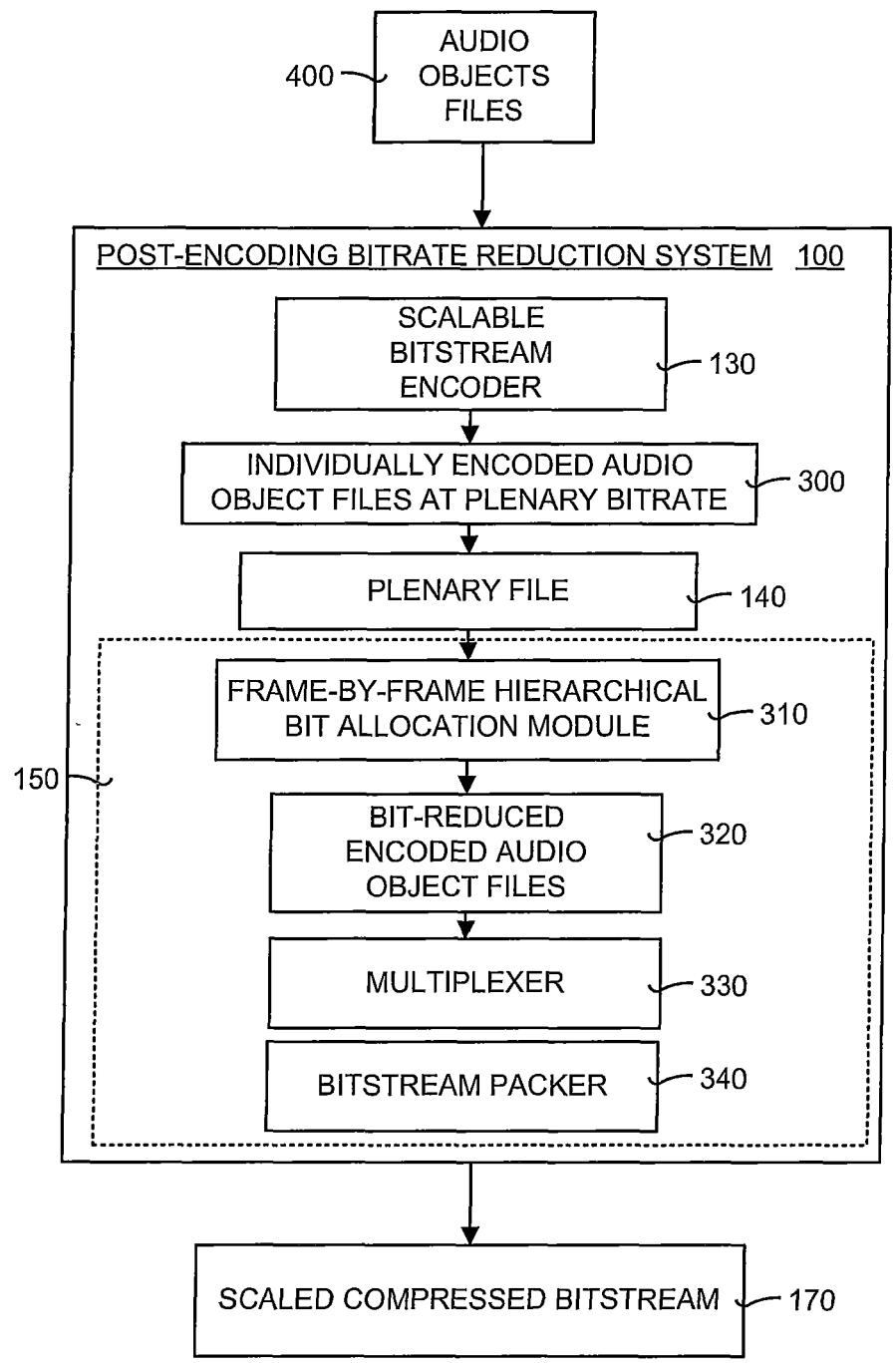
FIG. 4 is a block diagram illustrating details of a second embodiment of the post-encoding bitrate reduction system shown in FIGS. 1 and 2.

In some embodiments the audio object files have not yet been encoded. FIG. 4 is a block diagram illustrating details of a second embodiment of the post-encoding bitrate reduction system 100 shown in FIGS. 1 and 2. The unencoded audio object files 400 are received by embodiments of the system 100. The scalable bitstream encoder 130 independently encodes each of the audio object files 400 to obtain the plenary file 140.

The plenary file 140 is input to the bit reduction module 150. The frame-by-frame hierarchical bit allocation module 310 processes the plenary file 140 to obtain the bit-reduced encoded audio object files 320. A statistical multiplexer 330 takes the bit-reduced encoded audio object files 320 and combines them. A bitstream packer 340 then processes the multiplexed bit-reduced encoded audio object files 320 and packs them into frames and containers for transmission. The output of the bitstream packer 340 is the scaled compressed bitstream 170 containing variable-size frame payloads. The scaled compressed bitstream 170 is at a bitrate that is less than or equal to the target bitrate 160.

Figure 5:
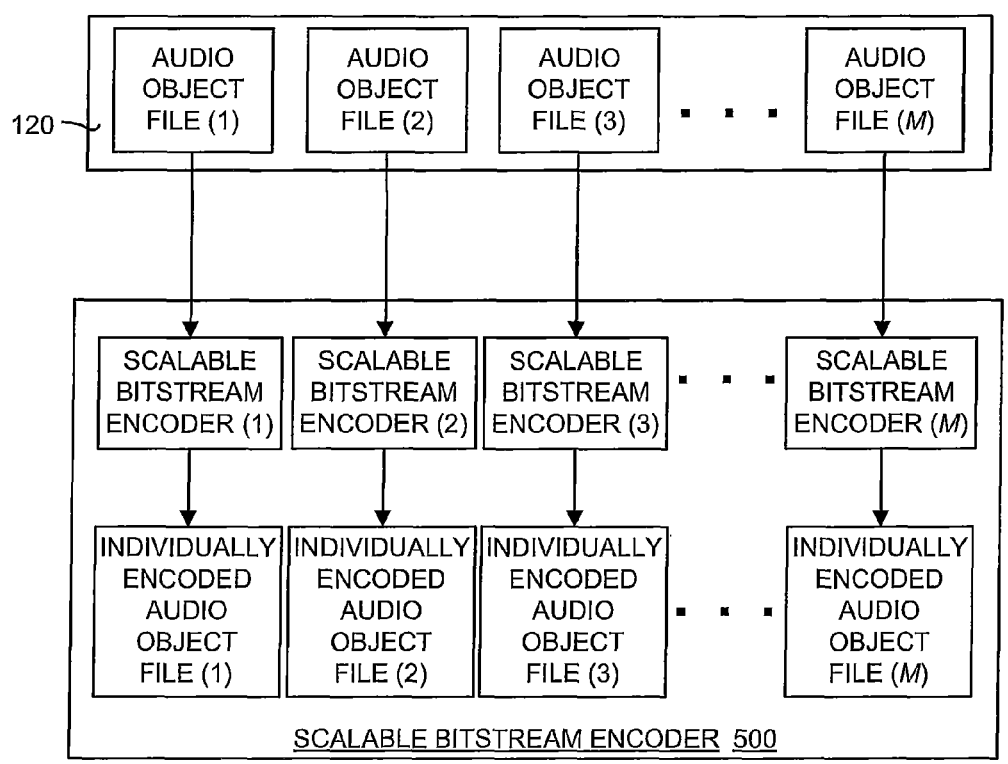
FIG. 5 is a block diagram illustrating an exemplary embodiment of the scalable bitstream encoder shown in FIGS. 1 and 4.

FIG. 5 is a block diagram illustrating an exemplary embodiment of the scalable bitstream encoder 130 shown in FIGS. 1 and 4. These embodiments of the scalable bitstream encoder 130 contain a plurality of scalable bitstream encoders. In the exemplary embodiment shown in FIG. 5, the scalable bitstream encoder 500 M decoders, namely scalable bitstream encoder (1) to scalable bitstream encoder (M), where M is a non-zero, positive integer. Input to the scalable bitstream encoder 500 is the audio signal 120. In these embodiments the audio signal 120 contains multiple audio object files. In particular, the audio signal 120 includes M number of audio object files, including audio object file (1) to audio object file (M).

In the exemplary embodiment shown in FIG. 5, the scalable bitstream encoder 500 contains M number of encoders for each of the M number of audio object files. Thus, there is an encoder for each audio object. However, in other embodiments the number of scalable bitstream encoders may be less than the number of audio object files. Irrespective of the number of scalable bitstream encoders, each of the plurality of encoders individually encodes each of the plurality of audio object files to obtain the individually encoded object files 300, namely individually encoded audio object file (1) to individually encoded audio object file (M).

Figure 6:
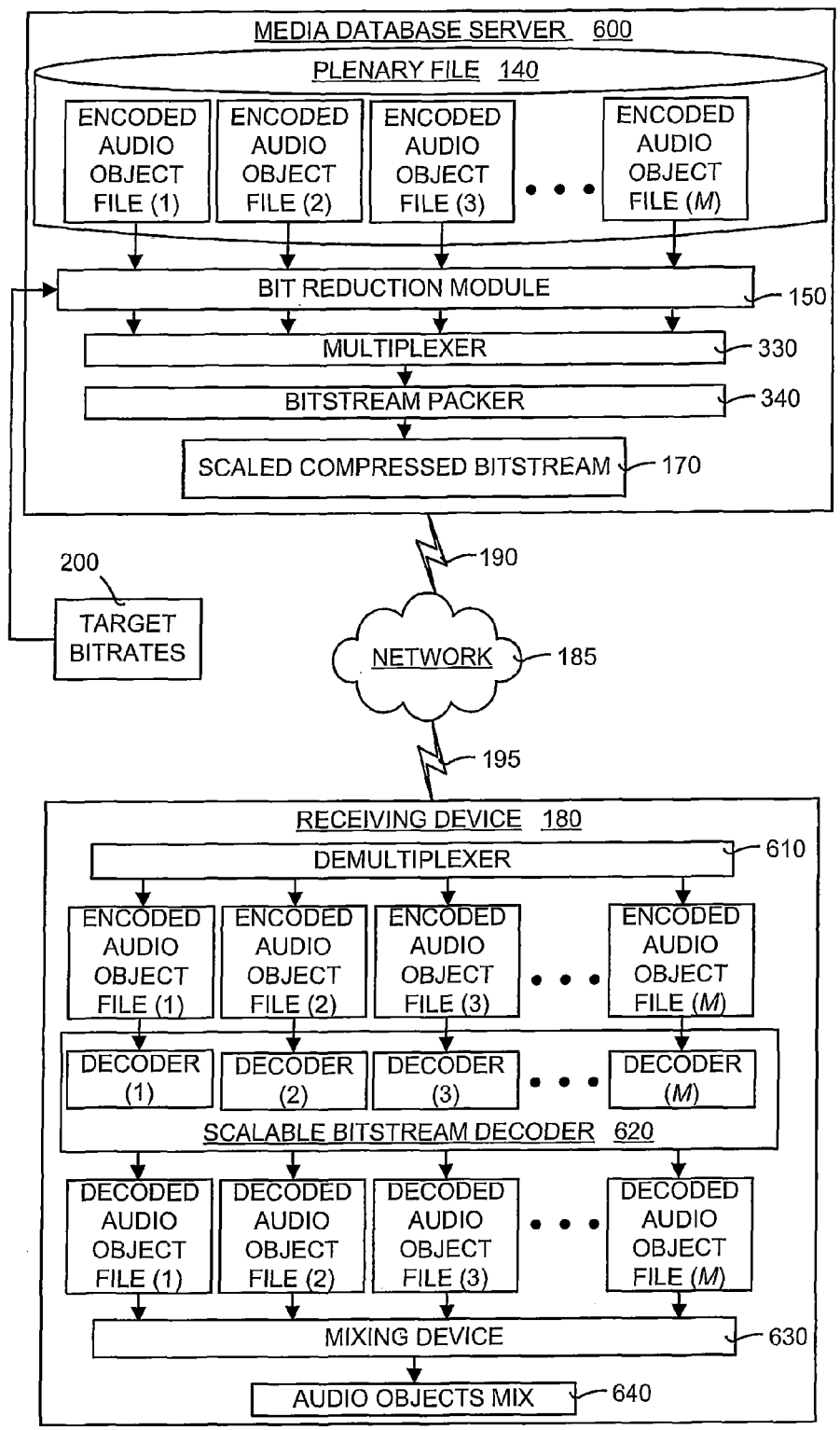
FIG. 6 is a block diagram illustrating an exemplary example of embodiments of the post-encoding bitrate reduction system and method implemented in a networking environment.

FIG. 6 is a block diagram illustrating an exemplary example of embodiments of the post-encoding bitrate reduction system 100 and method implemented in a networking environment. In FIG. 6, embodiments of the system 100 and method are shown implemented on a computing device in the form of a media database server 600. The media database server 600 may be virtually any device that includes a processor, such as a desktop computer, notebook computer, and embedded devices such as a mobile phone.

In some embodiments the system 100 and method are stored as cloud-based services for cross-application, cross-device access, on the media database server 600. The server 600 communicates with other devices over the network 185.

In some embodiments, one of the other devices is the receiving device 180. The media database server 600 accesses the network 185 using the first communications link 190 and the receiving device 180 accesses the network 185 using the second communications link 195. In this manner the media database server 600 and the receiving device 180 can communicate and transfer data between each other.

The plenary file 140, which contains encoded audio object files (1) to (M), is located on the media database server 600. The plenary file 140 is processed by the bit reduction module 150 to obtain the bit-reduced encoded audio object files 320. The bit-reduced encoded audio object files 320 are processed by the statistical multiplexer 330 and the bitstream packer 340 to generate the scaled compressed bitstream 170 at or less than the target bitrate. The target bitrate is obtained from the target bitrates 200 shown in FIG. 2.

In the embodiments shown in FIG. 6 the plenary file 140 is shown stored on the media database server 600. As noted above, the plenary file 140 contains M number of encoded audio object files that were independently encoded at the plenary bitrate. As used in this document, the bitrate is defined as a rate of flow of binary digits through a communications link or channel. In other words, the bitrate describes the rate at which bits are transferred from one location to another. The bitrate is typically expressed as the number of bits per second.

The bitrate can indicate download speed, such that for a given bitrate it takes less time to down load a 3 Gigabyte (Gb) file that a 1 Gb file. Bitrate can also be indicative of the quality of a media file. By way of example, an audio file that is compressed at 192 Kilobits per second (Kbps) generally will have better or higher quality (in the form of greater dynamic range and clarity) than the same audio file compressed at 128 Kbps. This is because more bits are used to represent the data for every second of playback. Thus, the quality of a multimedia file is measured and indicated by its associated bitrate.

In the embodiments shown in FIGS. 1-5, the encoded audio object files are encoded at a plenary bitrate that is greater than any of the target bitrates 200. This means that the encoded audio object files of the plenary file 140 are of a higher quality than the encoded audio object files contained in a scaled compressed bitstream 170 at any of the target bitrates 200.

The plenary file 140 and each of the encoded audio object files are input to embodiments of the post-encoding bitrate reduction system 100 and method. As discussed in detail below, embodiments of the system 100 and method use frame-by-frame bit reduction to reduce the number of bits used to represent the encoded audio object files. This is achieved without the need to re-encode the objects. This yields a bit-reduced file (not shown) containing a plurality of the bit-reduced encoded audio object files 320. This means that at least some of the encoded audio object files of the plenary file 140 are represented as bit-reduced encoded audio object files 320 by a reduced number of bits as compared to the plenary file 140. The individual bit-reduced encoded audio object files 320 then are processed by the statistical multiplexer 330 into a single signal and packed by the bitstream packer 340 into the scaled compressed bitstream 170. The scaled compressed bitstream 170 is at a bitrate that is less than or equal to the target bitrate. Moreover, the target bitrate is less than the plenary bitrate.

The scaled compressed bitstream 170 is transmitted over the network 185 to the receiving device 180. This transmission typically occurs upon request by the receiving device 180, although numerous other scenarios may occur, including having the scaled compressed bitstream 170 stored as a file on the media database server 600. The receiving device 180 may be any network-enabled computing device capable of storing or playing back the scaled compressed bitstream 170. Although the receiving device 180 is shown in FIG. 6 as residing on a different computing device than embodiments of the post-encoding bitrate reduction system 100 and method, it should be noted in some embodiments they may reside on the same computing device (such as the media database server 600).

The receiving device 180 processes the received scaled compressed bitstream 170 by using a demultiplexer 610 to separate the encoded audio object files into their individual constituents. As shown in FIG. 6, these individual constituents include the encoded audio object file (1), encoded audio object file (2), encoded audio object file (3), other encoded audio object files present (as indicated by the ellipsis), up to and including encoded audio object file (M). Each of these separate encoded audio object files is sent to a scalable bitstream decoder 620 that is capable of decoding the encoded audio object files. In some embodiments, the scalable bitstream decoder 630 contains a separate decoder for each of the encoded audio object files.

As shown in FIG. 6, in some embodiments the scalable bitstream decoder 620 includes a scalable decoder (1) (used to decode encoded audio object file (1)), scalable decoder (2) (used to decode encoded audio object file (2), scalable decoder (3) (used to decode encoded audio object file (3)), other scalable decoders as needed (as indicated by the ellipsis), and scalable decoder (M) (used to decode encoded audio object (file M)). It should be noted that in other embodiments any number of scalable decoders may be used to decode the encoded audio object files.

The output of the scalable bitstream decoder 620 is a plurality of decoded audio object files. Specifically, the plurality of decoded audio object files includes a decoded audio object file (1), decoded audio object file (2), decoded audio object file (3), other decoded audio object files that may be needed (as denoted by the ellipsis), and decoded audio object file (M). At this point the decoded audio object files may be stored for later use or used immediately. Either way, at least a portion of the decoded audio object files are input to a mixing device 630. Typically, the mixing device 630 is controlled by a user that is mixing the decoded audio object files to generate a personalized audio objects mix 640. However, in other embodiments the mixing of the decoded audio object files may be handled automatically by embodiments of the system 100 and method. In other embodiments audio objects mix 640 is created by a third-party vendor.

Figure 7:
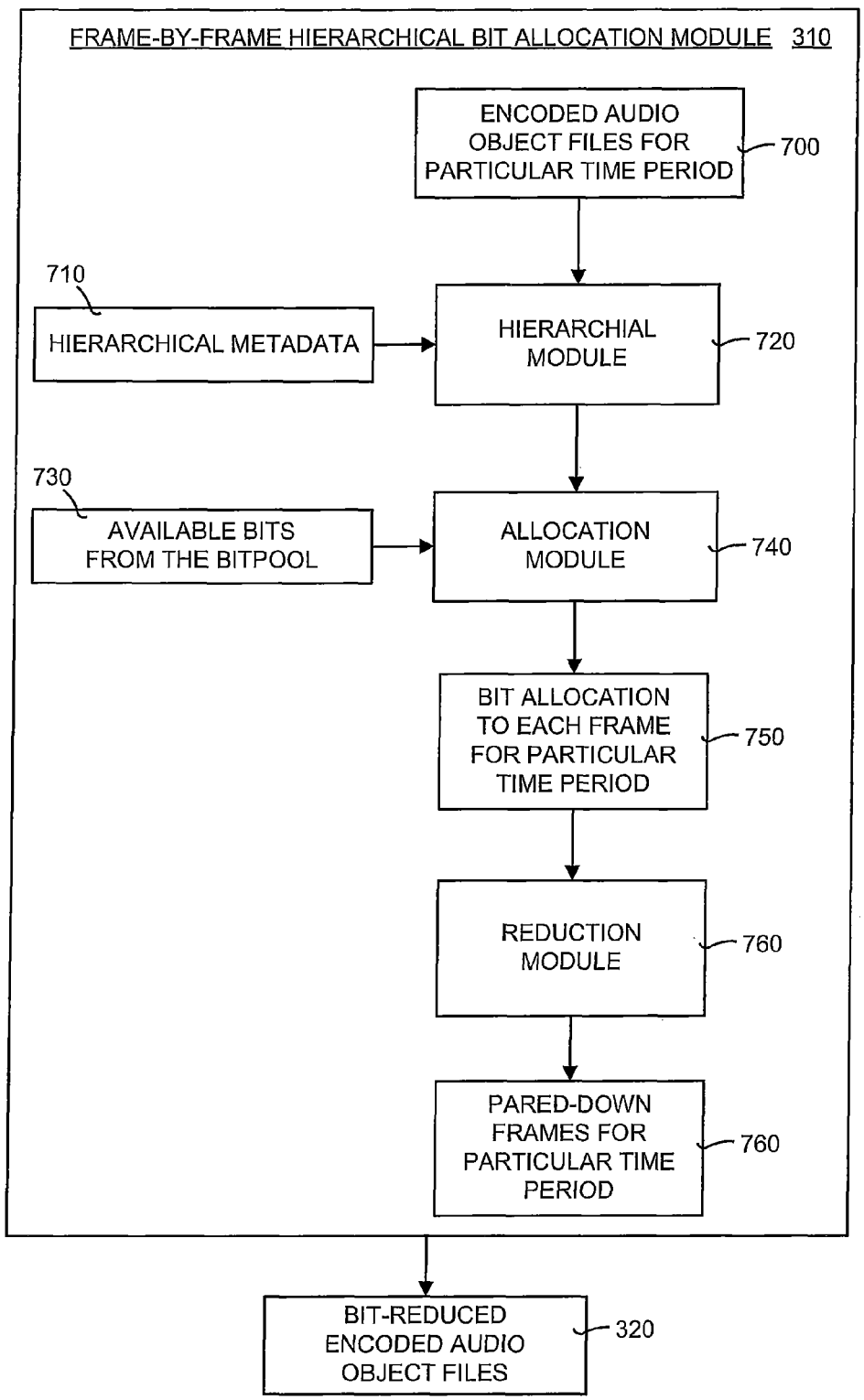
FIG. 7 is a block diagram illustrating the details of the frame-by-frame hierarchical bit allocation module shown in FIG. 3.

FIG. 7 is a block diagram illustrating the details of the frame-by-frame hierarchical bit allocation module 310 shown in FIG. 3. The module 310 receives individually-encoded audio object files 300 that have been encoded at the plenary bitrate. For a specific time period, each frame of each encoded audio object file in that time period is examined over all of the encoded audio object files for the particular time period 700. Hierarchical information 710 is input to a hierarchical module 720. The hierarchical information 710 includes data about how the frames should be prioritized and ultimately how bits should be allocated among the frames.

Available bits from the bitpool 730 are used by an allocation module 740 to determine how many bits are available to distribute among the frames during the time period. Based on the hierarchical information 710, the allocation module 740 allocates the bits among the frames in that time period. These bits are allocated across encoded audio object files, subbands, and frames based on the hierarchical information 710.

The allocation module 740 generates this bit allocation 750 that dictates the number of bits assigned to each frame in the particular time period. Based on the bit allocation, a reduction module 760 pares down the bits from each frame as needed to comply with the bit allocation 750 for that particular frame. This yields the pared-down frames 770 for the given time period. These pared-down frames are combined to generate the bit-reduced encode audio object files 320.

IV. Operational Overview

Figure 8:
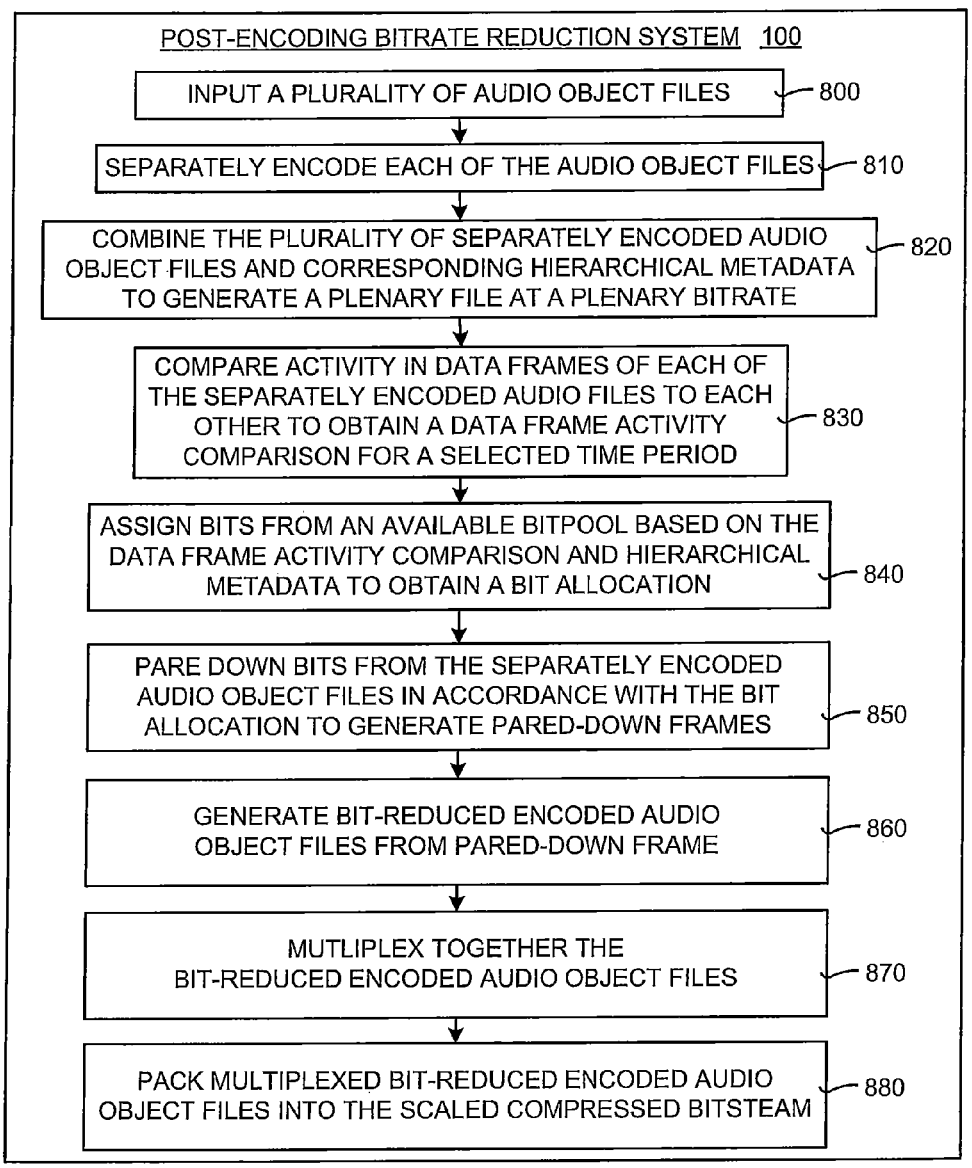
FIG. 8 is a flow diagram illustrating the general operation of embodiments of the post-encoding bitrate reduction system and method shown in FIGS. 1-7.

FIG. 8 is a flow diagram illustrating the general operation of embodiments of the post-encoding bitrate reduction system 100 and method shown in FIGS. 1-7. The operation begins by inputting a plurality of audio objects files (box 800). These audio object files can include a source signal in combination with its associated rendering metadata and can represent various sound sources. These sound sources may include individual musical instruments and vocals, and groupings of sound sources, such as an audio object of a drum kit containing a plurality of tracks of individual components of the drum kit.

Next, embodiments of the system 100 and method independently and separately encode each of the audio object files (box 810). This encoding employs one or more scalable bitstream encoders having a fine-grained scalability feature. Examples of scalable bitstream encoders having the fine-grained scalability feature is set forth in U.S. Pat. No. 7,333,929, issued on Feb. 19, 2008, entitled "Modular Scalable Compressed Audio Data Stream", and U.S. Pat. No. 7,548,853, issued on Jun. 16, 2009, entitled "Scalable Compressed Audio Bit Stream and Codec Using a Hierarchical Filterbank and Multichannel Joint Coding."

The system 100 and method combine the plurality of separately encoded audio files as well as any hierarchical metadata 710 to generate the plenary file 140 (box 820). The plenary file 140 is encoded at the plenary bitrate. It should be emphasized that each audio object file is individually encoded so as to retain separation and isolation between the plurality of audio object files.

The hierarchical metadata can contain at least three types of hierarchies or priorities. One or any combination of these types of priorities may be included in the hierarchical metadata. The first type of priority is bit priority within a frame. In these situations the bits are placed in order of psychoacoustic importance to human hearing. The second type of priority is frame priority within an audio object file. In these situations, the importance or priority of a frame is based on the activity of the frame. If the frame activity is high compared to other frames during the frame time interval, then it is ranked higher in the hierarchy than lower-activity frames.

A third type of priority is audio object file priority within the plenary file. This includes both cross-object masking and user-defined priority. In cross-object masking a particular audio object file may be masked by another audio object file based on where the audio objects are rendered in audio space. In this situation one audio object file would have priority over the masked audio object file. In user-defined priority, a user may define that one audio object file is more important to them that another audio object file. For example, for an audio soundtrack for a movie an audio object file containing dialog may have a higher importance to a user than an audio object file containing street noise or an audio object file containing background music.

Based on a desired target bitrate, the plenary file 140 is processed by the bit reduction module 150 produce the scaled compressed bitstream 170. The scaled compressed bitstream is generated without any re-encoding. Moreover, the scaled compressed bitstream is designed for transmission over a network channel at or less than the target bitrate.

The target bitrate is always less than the plenary bitrate. Moreover, it should be noted that each of the audio objects is independently encoded at a plenary bitrate that exceeds any of the target bitrates 200. In situations where the target bitrate is not known before encoding, each of the audio objects is encoded at a maximum available bitrate or at a bitrate that exceeds the highest anticipated target bitrate that will be used during transmission.

To obtain the scaled compressed bitstream, embodiments of the system 100 and method divide the plenary file 140 into a series of frames. In some embodiments each of the audio object files in the plenary file 140 is present throughout the entire duration of the file 140. This is true even if an audio object file contains periods of silence during playback.

Referring again to FIG. 8, embodiments of the system 100 and method select a frame time interval (or time period) and compare frame activity for frames during the selected time period (box 830). This frame time interval includes frames from each of the audio objects. The frame-by-frame comparison for the selected time period generates a data frame activity comparison for that time period. In general, frame activity is a measure of how difficult it is to encode the audio in the frame. Frame activity may be determined in a number of ways. In some embodiments the frame activity is based on a number of extracted tonals and the resultant frame residual energy. Other embodiments compute the entropy of the frame to arrive at the frame activity.

Bits are assigned or allocated from an available bitpool among the frames of the selected time period (box 840). Bits are allocated based on the data frame activity and the hierarchical metadata. Once the bit allocation among the frames for the selected time period is known, the bits are distributed among the frames. Each frame then brought into compliance with its bit allocation by paring down bits that are over the bit allocation for the frame to obtain pared-down frames (box 850). As explained in detail below, this bit reduction is performed in an ordered manner such that the bits having the highest priority and importance are pared down last.

This bit reduction taken over a plurality of pared-down frames in the plurality of encoded audio object files generates the bit-reduced encoded audio objects files 320 (box 860). The bit-reduced encoded audio object files 320 then are multiplexed together (box 870). The system 100 and method then packs the multiplexed bit-reduced encoded audio object files 320 using the bitstream packer 340 to obtain the scaled compressed bitstream 170 at the target bitrate (box 880).

In some situations the need may arise to transmit the encoded audio objects at several different bitrates. For example, if the plenary file is stored on the media database server 600 it may be requested by several clients each having different bandwidths requirements. In this case, a plurality of scaled compressed bitstreams may be obtained from the single plenary file 140. Moreover, each of the scaled compressed bitstreams can be at different target bitrates, where each of the target bitrates is less than the plenary bitrate. All this can be achieved without the need to re-encode the encoded audio object files.

Embodiments of the system 100 and method then may transmit one or more of the scaled compressed bitstreams to the receiving device 180 at a bitrate that is equal to or less than the target bitrate. The receiving device 180 then demultiplexes the received scaled compressed bitstream to obtain a plurality of bit-reduced encoded audio objects. Next, the system 100 and method decode these bit-reduced encoded audio objects using at least one scalable bitrate decoder to obtain a plurality of decoded audio object files. The decoded audio object files then may be mixed by an end user, content provider, or automatically to generate the audio objects mix 640.

V. Operational Details

Embodiments of the post-encoding bitrate reduction system 100 and method include embodiments that handle silent periods of audio and embodiments that deliver a single plenary file to variety of different bandwidth network channels. The silent period embodiments are direct to those occasions when several audio object files may have considerable periods of time in which the audio is silent or at a very low level as compared to other audio object files. For example, audio content containing music may have long periods where the vocal tracks are silent or at a very low level. When coding these audio object files using a constant bitrate audio codec, a significant amount of data payload is wasted on coding the silent periods.

The system 100 and method utilize the fine-grained scalability of each encoded audio object file to mitigate any waste of data (or frame) payload during silent periods. This achieves a reduction of overall compressed data payload without affecting the quality of reconstructed compressed audio. In some embodiments the encoded audio object files have start and stop times. The start time denotes the point in time where the silence begins and the stop time denotes where the silence ends. In these situations the system 100 and method can flag the frames between the start and stop times as null frames. This allows bits to be allocated to frames of other audio object files during a time period.

In other scenarios an on-the-fly bitrate reduction scheme may be needed in addition to or in place of the silent period embodiments. For example, this may occur when a single high-quality encoded audio file or bitstream containing a plurality of audio object files is stored on a server that needs to simultaneously service clients with different connection bandwidths. The single plenary file to variety of different bandwidth network channels embodiments use a fine-grained scalability feature of the audio file or bitstream to scale down the overall bitrate of the encoded audio object files while trying to preserve as much as possible the overall quality.

Figure 9:
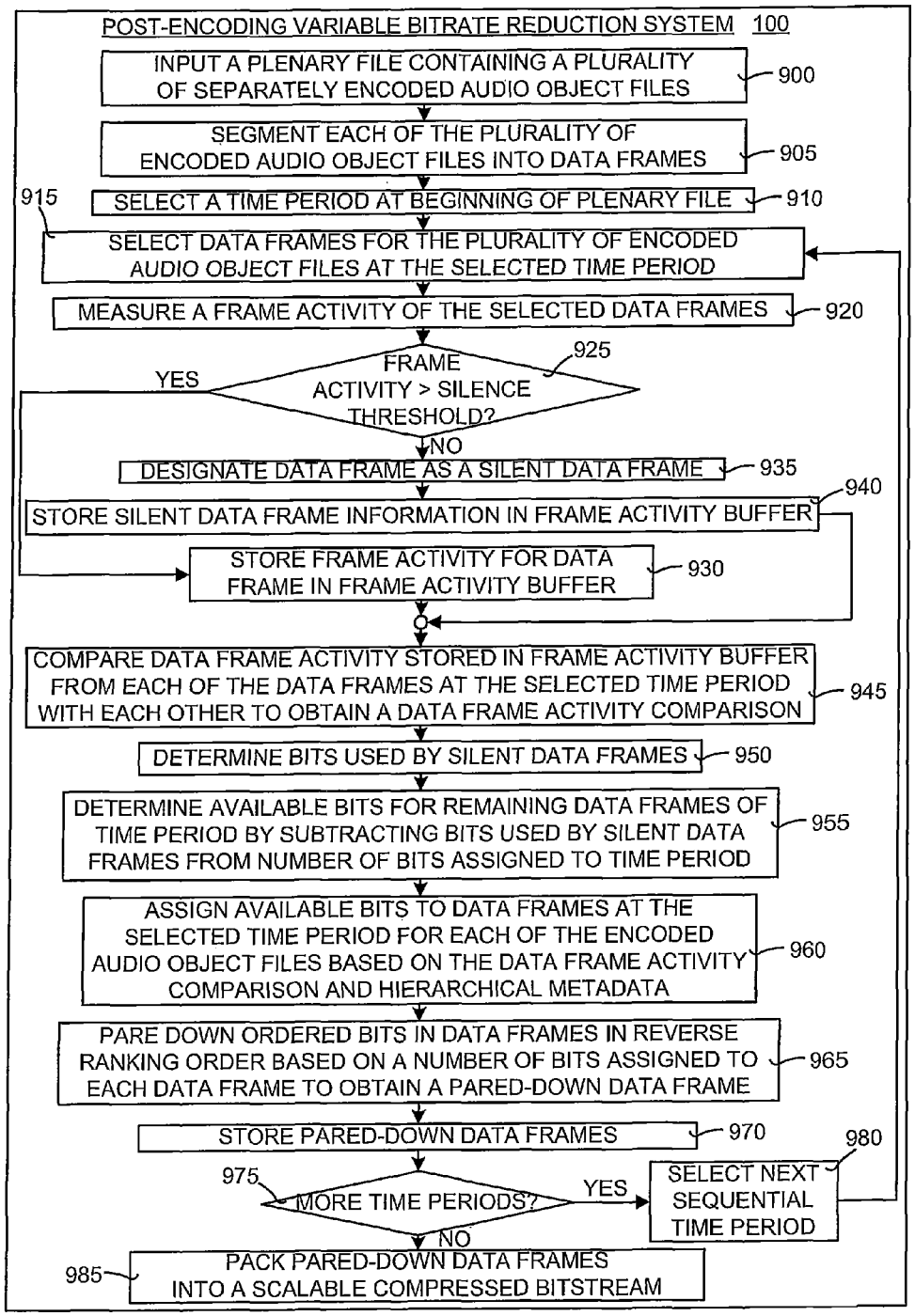
FIG. 9 is a flow diagram illustrating the details of a first embodiment of embodiments of the post-encoding bitrate reduction system and method shown in FIGS. 1-8.

The operational details of embodiments of the system 100 and method now will be discussed. FIG. 9 is a flow diagram illustrating the details of a first embodiment of embodiments of the post-encoding bitrate reduction system 100 and method shown in FIGS. 1-8. The operation begins by inputting a plenary file containing a plurality of separately encoded audio object files (box 900). Each of the plurality of encoded audio object files is segmented into data frames (box 905).

The system 100 and method then select a time period at the beginning of the plenary file (box 910). This time period ideally coincides with the temporal length of an individual frame. The selected time period begins at the beginning of the plenary file. The method processes the data frames of the selected time period and then sequentially processes the remainder of the data frames by taking the time periods in temporal order. In other words, the next time period selected is the time period that is adjacent in time to the previous time period and the method described above and below is used to process the data frames during each time period.

Next, the system 100 and method select data frames for the plurality of encoded audio object files during the selected time period (box 915). The frame activity is measured for each of the data frames in the audio object files during the selected time period (box 920). As noted above, a variety of techniques may be used to measure the frame activity.

For each data frame during the time period, the system 100 and method make a determination as to whether the measured frame activity is greater than a silence threshold (box 925). If so, then the frame activity for the data frame is stored in a frame activity buffer (box 930). If the measured frame activity is less than or equal to the silence threshold, then the data frame is designated as a silent data frame (box 935). This designation means that the data frame has already been reduced to a minimum payload and the number of bits in that frame is used to represent the data frame without further reduction. The silent data frame then is stored in the frame activity buffer (box 940).

The system 100 and method then compare the data frame activity that is stored in the frame activity buffer for each of the data frames at the selected time period to the other data frames for the current time period (945). This yields a data frame activity comparison. The system 100 and method then determine the number of available bits that are used by any silent frames during the time period (box 950). The number of available bits that may be assigned to the remaining data frames during the time period then is determined. This is done by subtracting bits used by any silent data frames from the number of bits that have been assigned to be used during the time period (box 955).

Bit allocation among the remaining data frames is performed by assigning the available bits to data frames from each of the encoded audio object files at the selected time period (box 960). This bit allocation is performed based on the data frame activity comparison and the hierarchical metadata. Next, the ordered bits in the data frames are pared down to comply with the bit allocation (box 965). In other words, the bits are removed from a data frame in such a way that the important bits are removed last and the least important bits are removed first. This continues until only the number of bits allocated to that particular frame remains. The result is a pared-down data frame.

These pared-down data frames are stored (box 970) and a determination is made as to whether there are more time periods (box 975). If so, then the next sequential time period is selected (box 980). The process begins again by selecting data frames for the plurality of encoded audio object files at the new time period (box 915). Otherwise, the pared-down data frames are packed into a scalable compressed bitstream (box 985).

V.A. Frames and Containers

As discussed above, in some embodiments the plenary file 140 includes multiple encoded audio object files. Some or all of these encoded audio object files may contain any combination of audio data, sound information, and associated metadata. Moreover, in some embodiments the encoded audio object files can be divided or partitioned into data frames. The use of data frame, or frames, can be efficient for streaming applications. In general, a "frame" is a discrete data segment created by the codec and used in encoding and decoding.

Figure 10:
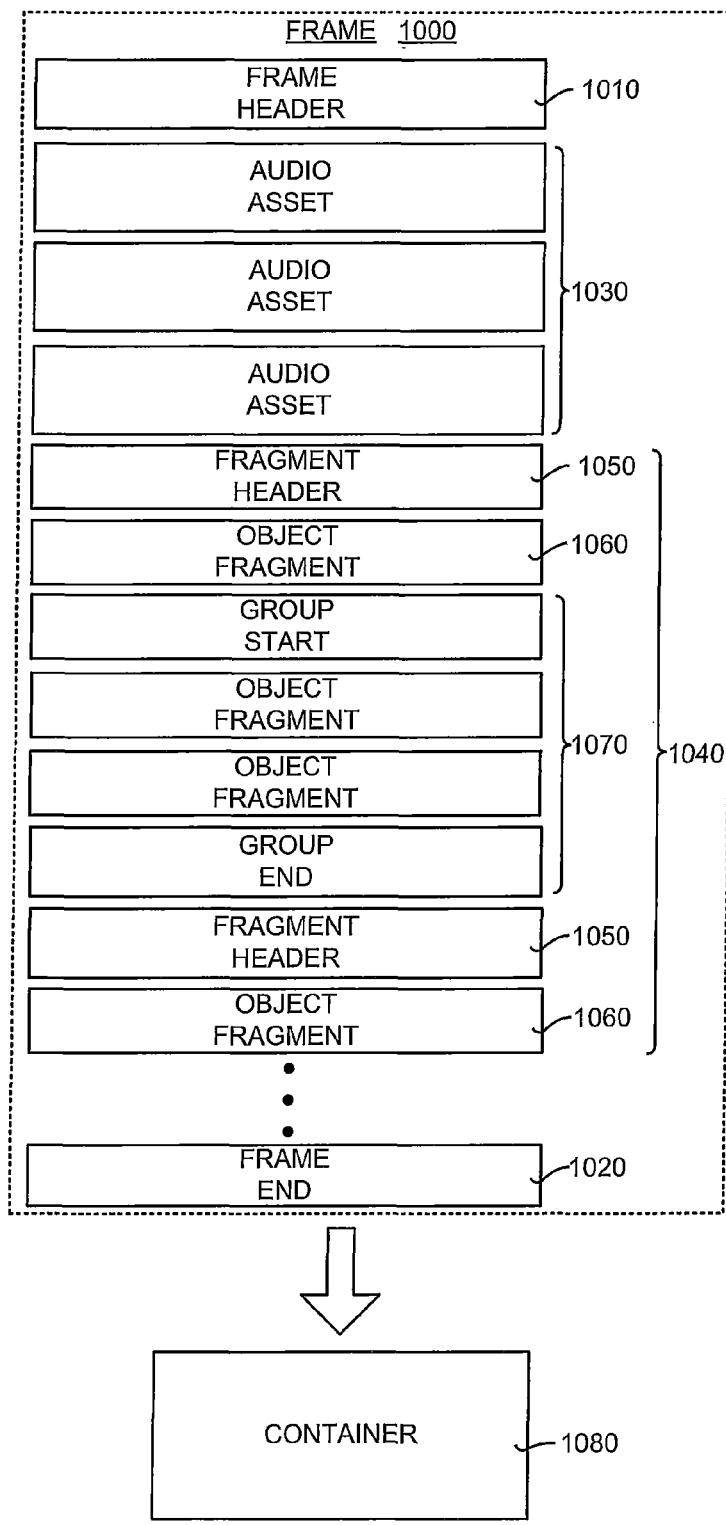
FIG. 10 illustrates an audio frame according to some embodiments of the post-encoding bitrate reduction system and method shown in FIGS. 1-9.

FIG. 10 illustrates an audio frame 1000 according to some embodiments of the post-encoding bitrate reduction system 100 and method shown in FIGS. 1-9. The frame 1000 includes a frame header 1010, which can be configured to indicate the start of the frame 1000, and a frame end 1020, which can be configured to indicate the end of the frame 1000. The frame 1000 also includes one or more encoded audio data blocks 1030 and corresponding metadata 1040. The metadata 1040 includes one or more fragment header 1050 blocks, which can be configured to indicate the start of a new metadata fragment. This metadata 1040 may include the hierarchical metadata 710 used by the hierarchical module 720.

Ungrouped audio objects can be included as object fragments 1060. Grouped audio objects 1070 can include group start and end blocks. These blocks can be configured to indicate the start and end of a new group. In addition, the grouped audio objects 1070 can include one or more object fragments. In some embodiments the frame 1000 then can be encapsulated into a container (such as MP4).

Generally, a "container" or wrapper format is a metafile format whose specification describes how different data elements and metadata coexist in a computer file. A container refers to the way the data is organized within the file, regardless of which coding scheme is used. Moreover, the container serves to "wrap" multiple bitstreams together and synchronize the frames to ensure that they are presented in proper order. The container also can take care of adding information for streaming servers, if necessary, so that a streaming server knows when to send which part of the file. As shown in FIG. 10, the frame 1000 can be packed into a container 1080. Examples of digital container formats that can be used for the container 1080 include Transport Stream (TS), Material Exchange Format (MXF), Moving Pictures Expert Group, Part 14 (MP4), and so forth.

V.B. Fine-Grained Bitstream Scalability

The structure and order of elements placed in the scaled compressed bitstream 170 provide for a wide bit range and fine-grained scalability of the bitstream 170. This structure and order allows the bitstream 170 to be smoothly scaled by external mechanisms, such as the bit reduction module 150.

Figure 11:
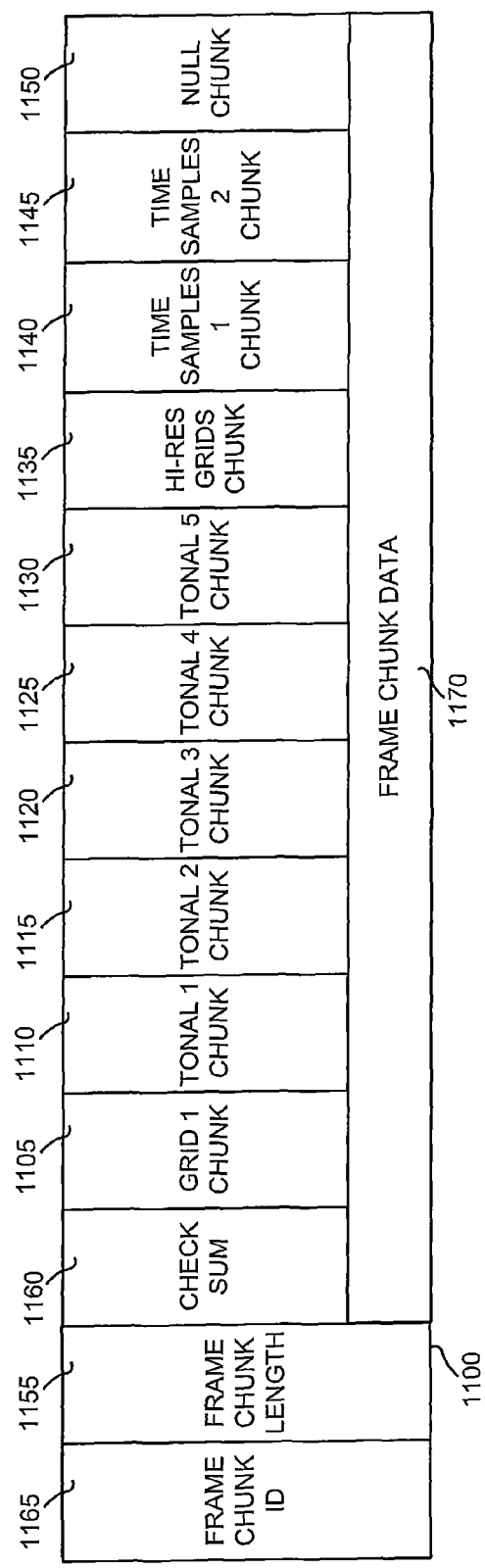
FIG. 11 illustrates an exemplary embodiment of a scalable frame of data produced by the scalable bitstream encoder shown in FIG. 1.

FIG. 11 illustrates an exemplary embodiment of a scalable frame of data produced by the scalable bitstream encoder 130 shown in FIG. 1. It should be noted that one or more other types of audio compression codecs that are based on other decomposition rules may be used to provide fine-grained scalability to embodiments of the post-encoding bitrate reduction system 100 and method. In these situations other codes will provide a different set of psychoacoustically relevant elements.

The scalable compressed bitstream 170 used in the example of FIG. 11 is made up of a number of resource interchange file format (RIFF) data structures (called "chunks"). It should be noted that this is an exemplary embodiments, and other types of data structures may be used. This RIFF file format, which is well known by those skilled in the art, allows for identification of the type of data carried by a chunk as well as the amount of data carried by a chunk. Note that any bitstream format that carries information regarding the amount and type of data carried in its defined bitstream data structure can be used with embodiments of the system 100 and method.

FIG. 11 illustrates a layout of a scalable bitrate frame chunk 1100, along with the sub-chunks including a grid 1 chunk 1105, a tonal 1 chunk 1110, a tonal 2 chunk 1115, a tonal 3 chunk 1120, a tonal 4 chunk 1125, a tonal 5 chunk 1130. Further, the sub-chunks include a hi-resolution grids chunk 1135, a time samples 1 chunk 1140, and a time samples 2 chunk 1145. These chunks make up the psychoacoustical data being carried within the frame chunk 1100. Although FIG. 11 only depicts chunk identification (ID) and chunk length for the frame chunk 1100, sub-chunk ID and sub-chunk length data are included in each sub-chunk.

FIG. 11 shows the order of chunks in a frame of the scalable bitstream. These chunks contain the psychoacoustic audio elements produced by the scalable bitstream encoder 130 shown in FIG. 1. In addition to the chunks being arranged in psychoacoustic importance, the audio elements in the chunks are also arranged in psychoacoustic importance.

The last chunk in the frame is a null chunk 1150. This is used to pad chunks in the case where the frame is required to be a constant or specific size. Therefore, the null chunk 1150 has no psychoacoustic relevance. As shown in FIG. 11, is the least important psychoacoustic chunk is the time samples 2 chunk 1145. Conversely, the most important psychoacoustic chunk is the grid 1 chunk 1105. In operation, if it is needed to scale down the scalable bitrate frame chunk 1100, data is removed starting with the least psychoacoustically relevant chunk (the time samples 2 chunk 1145) at the end of the bitstream and moving up the psychoacoustical relevance ranking. This would be moving from right to left in FIG. 11. This means that the most psychoacoustically relevant chunk (the grid 1 chunk 1105), which has the highest quality possible in the scalable bitrate frame chunk 1100, is the most likely to not be removed.

It should be noted that the highest target bitrate (along with the highest audio quality) that would be able to be supported by the bitstream is defined at the time of encoding. However, the lowest bitrate after scaling can be defined by the level of audio quality that is acceptable for use by an application. Each psychoacoustic element removed does not utilize the same number of bits. By way of example, the scaling resolution for the exemplary embodiments shown in FIG. 11 ranges from 1 bit for elements of the lowest psychoacoustic importance to 32 bits for those elements of highest psychoacoustic importance.

It also should be noted that the mechanism for scaling the bitstream does not need to remove entire chunks at a time. As previously noted, audio elements within each chunk are arranged so that the most psychoacoustically important data is placed at the beginning of the scalable bitrate frame chunk 1100 (nearest the right side of FIG. 11). For this reason, audio elements can be removed from the end of the chunk, one element at a time, by a scaling mechanism while maintaining the best audio quality possible with each element removed from the scalable bitrate frame chunk 1100. This is what is meant by "fine-grained scalability."

The system 100 and method remove audio elements within the chunk as required and then update a chunk length field of the particular chunk from which the audio elements were removed. Moreover, the system 100 and method also updates a frame chunk length 1155 and a frame checksum 1160. With an updated chunk length field for each chunk scaled as well as an updated frame chunk length 1155 and updated frame checksum information, a decoder can properly process and decode the scaled bitstream. In addition, the system 100 and method can automatically produce a fixed data rate audio output signal, even though there are chunks within the bitstream that are missing audio elements and chunks that are completely missing from the bitstream. In addition, a frame chunk identification (frame chunk ID 1165) is contained in the scalable bitrate frame chunk 1100 for identification purposes. Moreover, frame chunk data 1170 contains (moving from right to left) the checksum 1160 through the null chunk 1150.

V.C. Bit Allocation

Figure 12:
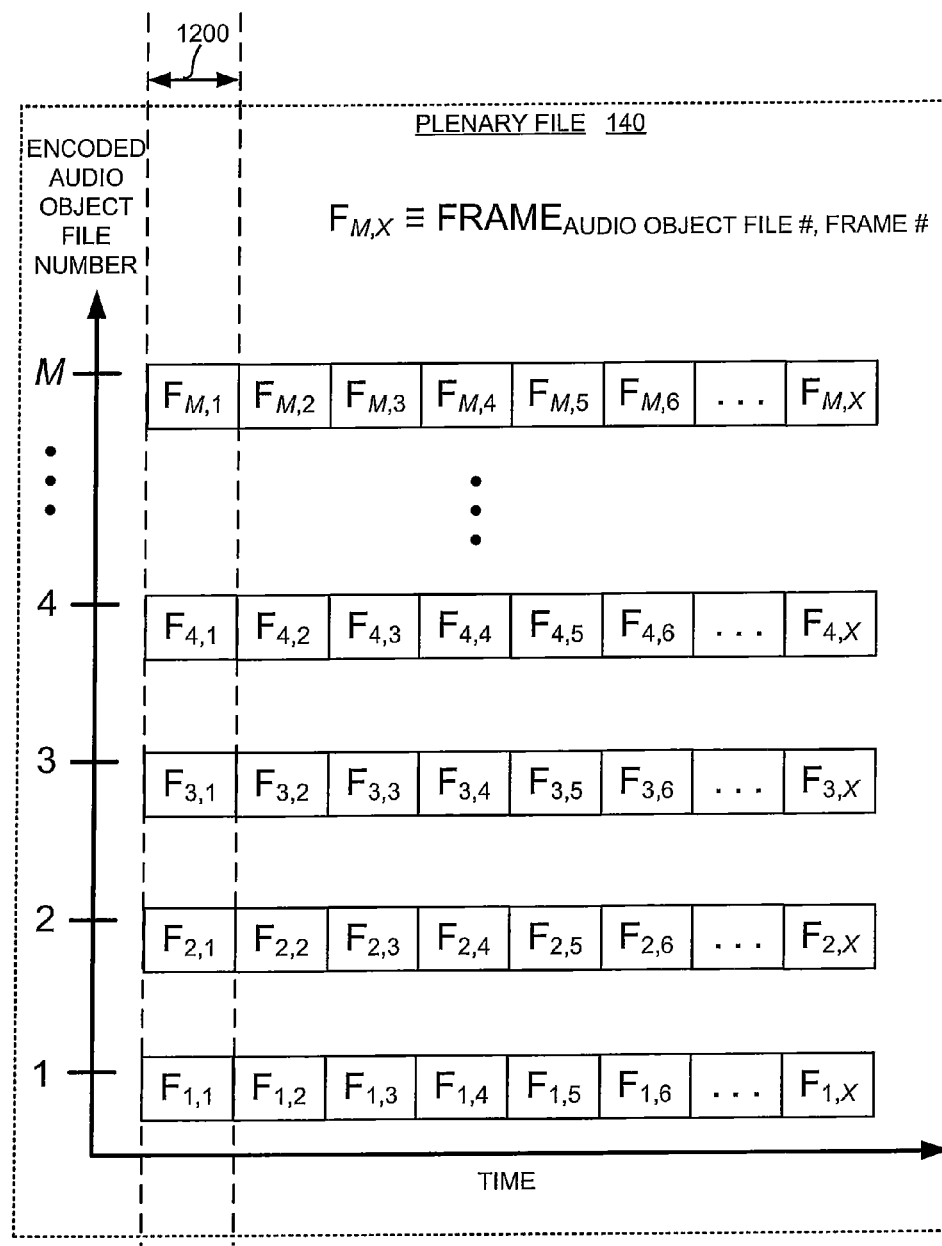
FIG. 12 illustrates an exemplary embodiment of an example of dividing the plenary file into a plurality of frames and time periods.

An example of the allocation of bits between frames during a time period will now be discussed. It should be noted that this is only one of several ways in which bit allocation may be performed. FIG. 12 illustrates an exemplary embodiment of an example of dividing the plenary file 140 into a plurality of frames and time periods. As shown in FIG. 12, the plenary file 140 is shown divided into a plurality of frames for a plurality of audio objects. The x-axis is the time axis and the y-axis is the encoded audio object file number. In this example there are M number of encoded audio objects, where M is a positive, non-zero integer. Moreover, in this exemplary example each encoded audio object file is present for the entire duration of the plenary file 140.

Looking left to right across the time axis it can be seen that each encoded audio objects (number 1 to M) are divided into X number of frames, where X is a positive, non-zero integer. Each of the boxes is denoted by a designation $F_{M,X}$, where F is the frame, M is the audio object file number, and X is the frame number. For example, frame $F_{1,2}$ denotes the $2^{nd}$ frame of encoded audio object file (1).

Figure 13:
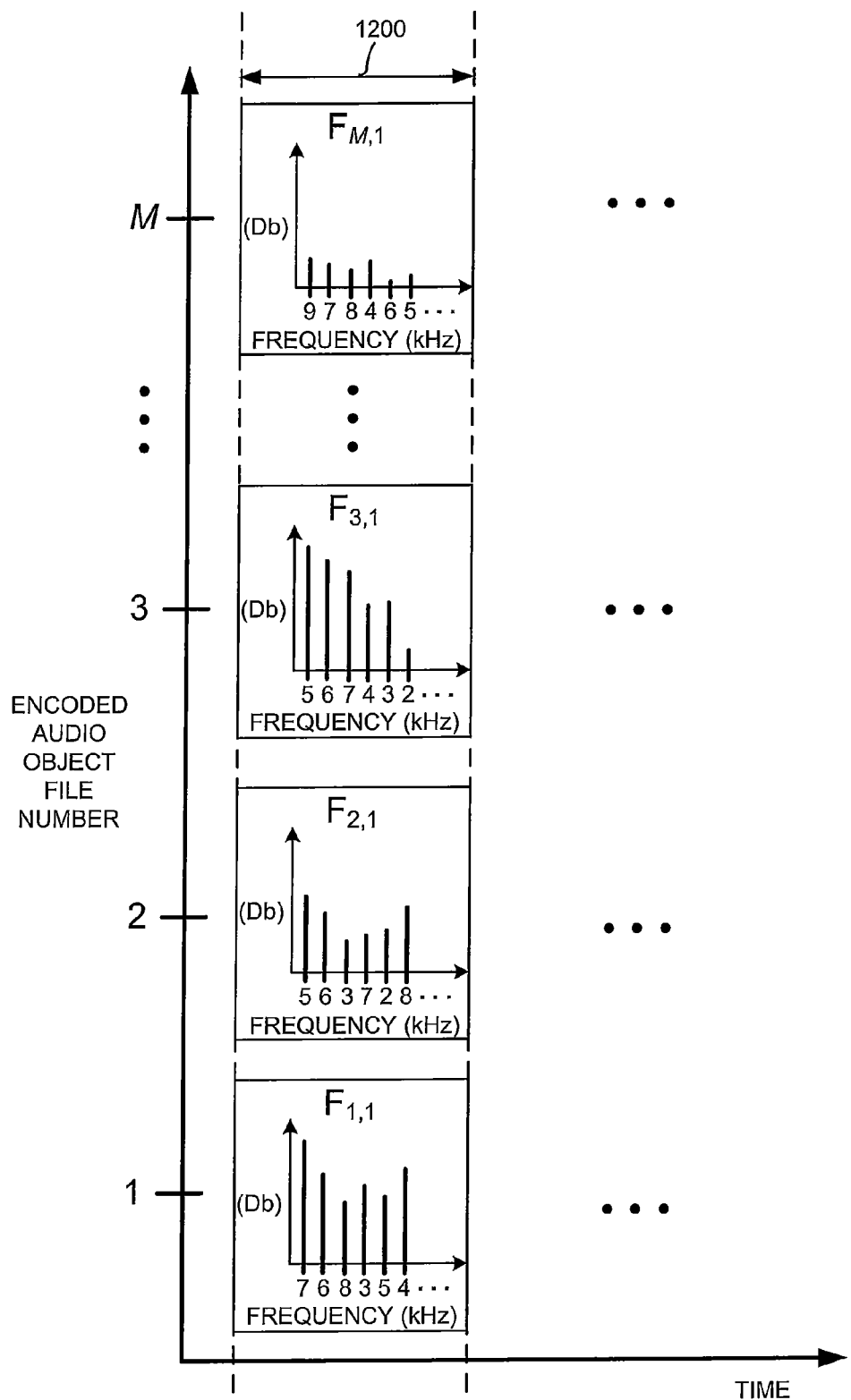
FIG. 13 illustrates the details of the frames of the plenary file within the time period.

As shown in FIG. 12, a time period 1200 corresponding to a length of a frame is defined for the plenary file 140. FIG. 13 illustrates the details of the frames of the plenary file 140 within the time period 1200. Within each frame is illustrated its ordered frequency components with respective to their relative importance to the quality of the plenary file 140. Note that the x-axis is the frequency (in kHz) and the y-axis represents the magnitude (in decibels) of a particular frequency. For example, in $F_{1,1}$ it can be seen that 7 kHz is the most important frequency component (in this example), followed by the 6 kHz and 8 kHz frequency components, respectively, and so forth. Thus, each frame of each audio object contains these ranked frequency components.

The target bitrate is used determine a number of available bits for the time period 1200. In some embodiments, psychoacoustics (such as a masking curve) is used to distribute the available bits in an uneven manner across the frequency components. For example, the number of available bits for each of the 1, 19, and 20 kHz frequency components may be 64 bits, while 2048 bits are available for each of the 7, 8, and 9 kHz frequency components. This is because following the masking curve the human ear is most sensitive to the 7, 8, and 9 kHz frequency components, while the human ear is relatively insensitive to very low and very high components, namely the 1 kHz and below frequency components and the 19 and 20 kHz frequency components. Although psychoacoustics is used to determine the distribution of available bits across the frequency range, it should be noted that many other different techniques may be used to distribute the available bits.

Embodiments of the post-encoding bitrate reduction system 100 and method then measure the frame activity of each frame for the corresponding time period 1200 for each encoded audio object file. The frame activity for each of the data frames of each of the encoded audio object files in the time period 1200 are compared to each other. This is known as the data frame activity comparison, which is the frame activity relative to the other frames during the time period 1200.

In some embodiments, the frames are assigned a frame activity number. By way of example, assume that the number of audio object files is 10 such that the frame activity number ranges from 1 to 10. In this example a 10 means the frame during the time period 1200 having the most frame activity and a 1 means the frame having the least activity. It should be noted that many other techniques may be used to rank the frame activity within each of the frames during the time period 1200. Based on the data frame activity comparison and the available bits from the bitpool, embodiments of the system 100 and method then allocate the available bits between the frames of the encoded audio objects files for the time period 1200.

The number of available bits and the data frame activity comparison are used by the system 100 and method to pare down the bits in the frames as necessary to comply with the allocated bits. The system 100 and method take advantage of fine-grained scalability feature and the fact that the bits are ranked in order of importance based on the hierarchical metadata. For example, referring to FIG. 13, for $F_{1,1}$ suppose that there are only enough allocated bits to represent the first four frequency components. This means that the 7, 6, 8, and 3 kHz frequency components would be included in the bit-reduced encoded bitstream. The 5 kHz frequency component of $F_{1,1}$ and those frequency components lower in the order are discarded.

In some embodiments the data frame activity comparison is weighted by an audio object importance. This information is contained in the hierarchical metadata 710. By way of example, supposed that the encoded audio object file #2 is important to the audio signal, which may occur if the audio is a movie soundtrack and encoded audio object file #2 is the dialog track. Even though encoded audio object file #9 may the highest relative frame activity ranking of 10 and encoded audio object file #2 has a ranking of 7, the ranking of encoded audio object file #2 may be increased to 10 because of weighting due to the audio object importance. It should be noted that many variations of the above technique and other techniques may be used to allocate the bits.

VI. Alternate Embodiments and Exemplary Operating Environment

Many other variations than those described herein will be apparent from this document. For example, depending on the embodiment, certain acts, events, or functions of any of the methods and algorithms described herein can be performed in a different sequence, can be added, merged, or left out altogether (such that not all described acts or events are necessary for the practice of the methods and algorithms). Moreover, in certain embodiments, acts or events can be performed concurrently, such as through multi-threaded processing, interrupt processing, or multiple processors or processor cores or on other parallel architectures, rather than sequentially. In addition, different tasks or processes can be performed by different machines and computing systems that can function together.

The various illustrative logical blocks, modules, methods, and algorithm processes and sequences described in connection with the embodiments disclosed herein can be implemented as electronic hardware, computer software, or combinations of both. To clearly illustrate this interchangeability of hardware and software, various illustrative components, blocks, modules, and process actions have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of this document.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, such as a combination of a DSP and a microprocessor, a plurality of microprocessors, one or more microprocessors in conjunction with a DSP core, or any other such configuration.

Embodiments of the post-encoding bitrate reduction system 100 and method described herein are operational within numerous types of general purpose or special purpose computing system environments or configurations. In general, a computing environment can include any type of computer system, including, but not limited to, a computer system based on one or more microprocessors, a mainframe computer, a digital signal processor, a portable computing device, a personal organizer, a device controller, a computational engine within an appliance, a mobile phone, a desktop computer, a mobile computer, a tablet computer, a smartphone, and appliances with an embedded computer, to name a few.

Such computing devices can be typically be found in devices having at least some minimum computational capability, including, but not limited to, personal computers, server computers, hand-held computing devices, laptop or mobile computers, communications devices such as cell phones and PDA's, multiprocessor systems, microprocessor-based systems, set top boxes, programmable consumer electronics, network PCs, minicomputers, mainframe computers, audio or video media players, and so forth. In some embodiments the computing devices will include one or more processors. Each processor may be a specialized microprocessor, such as a digital signal processor (DSP), a very long instruction word (VLIW), or other micro-controller, or can be conventional central processing units (CPUs) having one or more processing cores, including specialized graphics processing unit (GPU)-based cores in a multi-core CPU.

The process actions of a method, process, or algorithm described in connection with the embodiments disclosed herein can be embodied directly in hardware, in a software module executed by a processor, or in any combination of the two. The software module can be contained in computer-readable media that can be accessed by a computing device. The computer-readable media includes both volatile and nonvolatile media that is either removable, non-removable, or some combination thereof. The computer-readable media is used to store information such as computer-readable or computer-executable instructions, data structures, program modules, or other data. By way of example, and not limitation, computer readable media may comprise computer storage media and communication media.

Computer storage media includes, but is not limited to, computer or machine readable media or storage devices such as Bluray discs (BD), digital versatile discs (DVDs), compact discs (CDs), floppy disks, tape drives, hard drives, optical drives, solid state memory devices, RAM memory, ROM memory, EPROM memory, EEPROM memory, flash memory or other memory technology, magnetic cassettes, magnetic tapes, magnetic disk storage, or other magnetic storage devices, or any other device which can be used to store the desired information and which can be accessed by one or more computing devices.

A software module can reside in the RAM memory, flash memory, ROM memory, EPROM memory, EEPROM memory, registers, hard disk, a removable disk, a CD-ROM, or any other form of non-transitory computer-readable storage medium, media, or physical computer storage known in the art. An exemplary storage medium can be coupled to the processor such that the processor can read information from, and write information to, the storage medium. In the alternative, the storage medium can be integral to the processor. The processor and the storage medium can reside in an application specific integrated circuit (ASIC). The ASIC can reside in a user terminal. Alternatively, the processor and the storage medium can reside as discrete components in a user terminal.

The phrase "non-transitory" as used in this document means "enduring or long-lived". The phrase "non-transitory computer-readable media" includes any and all computer-readable media, with the sole exception of a transitory, propagating signal. This includes, by way of example and not limitation, non-transitory computer-readable media such as register memory, processor cache and random-access memory (RAM).

Retention of information such as computer-readable or computer-executable instructions, data structures, program modules, and so forth, can also be accomplished by using a variety of the communication media to encode one or more modulated data signals, electromagnetic waves (such as carrier waves), or other transport mechanisms or communications protocols, and includes any wired or wireless information delivery mechanism. In general, these communication media refer to a signal that has one or more of its characteristics set or changed in such a manner as to encode information or instructions in the signal. For example, communication media includes wired media such as a wired network or direct-wired connection carrying one or more modulated data signals, and wireless media such as acoustic, radio frequency (RF), infrared, laser, and other wireless media for transmitting, receiving, or both, one or more modulated data signals or electromagnetic waves. Combinations of the any of the above should also be included within the scope of communication media.

Further, one or any combination of software, programs, computer program products that embody some or all of the various embodiments of the post-encoding bitrate reduction system 100 and method described herein, or portions thereof, may be stored, received, transmitted, or read from any desired combination of computer or machine readable media or storage devices and communication media in the form of computer executable instructions or other data structures.

Embodiments of the post-encoding bitrate reduction system 100 and method described herein may be further described in the general context of computer-executable instructions, such as program modules, being executed by a computing device. Generally, program modules include routines, programs, objects, components, data structures, and so forth, which perform particular tasks or implement particular abstract data types. The embodiments described herein may also be practiced in distributed computing environments where tasks are performed by one or more remote processing devices, or within a cloud of one or more devices, that are linked through one or more communications networks. In a distributed computing environment, program modules may be located in both local and remote computer storage media including media storage devices. Still further, the aforementioned instructions may be implemented, in part or in whole, as hardware logic circuits, which may or may not include a processor.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others.

Moreover, although the subject matter has been described in language specific to structural features and methodological acts, it is to be understood that the subject matter defined in the appended claims is not necessarily limited to the specific features or acts described above. Rather, the specific features and acts described above are disclosed as example forms of implementing the claims.

What is claimed is:

1. A method for obtaining multiple scaled compressed bitstreams from a single plenary file, comprising:
   separately encoding a plurality of audio object files to obtain a plurality of encoded audio object files at a plenary bitrate using a scalable bitstream encoder having fine-grained scalability that ranks bits in each data frame of the encoded audio object files in an order of psychoacoustic importance to human hearing;
   generating the plenary file at the plenary bitrate by combining the plurality of independently encoded audio object files and corresponding hierarchical metadata that includes a user-defined priority for each of the independently encoded audio object files to rank the files in order of importance to such that the user defines one of the audio object files as more important to the user than another one of the audio object files;
   constructing a first scaled compressed bitstream at a first target bitrate from the plenary file and assigning each and every one of the independently encoded audio object files at least some bits based on the priority such that higher priority files are assigned more bits as compared to lower priority files; and
   constructing a second scaled compressed bitstream at a second target bitrate from the plenary file such that multiple scaled bitstreams at different target bitrates are obtained from the single plenary file without any re-encoding of the plurality of encoded audio object files for playback on an embedded device having a processor;
   wherein the first target bitrate and the second target bitrate are different from each other and are both less than the plenary bitrate.

2. The method of claim 1, wherein the first target bitrate is a maximum bitrate at which the first scaled compressed bitstream will be transmitted.

3. The method of claim 2, wherein each of the plurality of encoded audio object files is persistent and present for an entire duration of the plenary file.

4. The method of claim 3, further comprising:
   comparing a data frame activity of data frames of each of the plurality of encoded audio files at a selected time period to each other to obtain a data frame activity comparison;
   assigning bits to each of the data frames of the encoded audio object files at the selected time period based on the data frame activity comparison and the first target bitrate to obtain a bit allocation for the selected time period;
   scaling down the plenary file by truncating bits of the data frames in accordance with the bit allocation to achieve the first target bitrate and obtain bit-reduced encoded audio object files; and
   multiplexing together and packing the bit-reduced audio object files into the first scaled compressed bitstream at the first target bitrate.

5. The method of claim 4, further comprising:
   transmitting the first scaled compressed bitstream to a receiving device at the first target bitrate; and
   decoding the first scaled compressed bitstream to obtain decoded audio objects.

6. The method of claim 5, further comprising mixing the decoded audio objects to create an audio objects mix for playback on an embedded device having a processor.

7. The method of claim 1, wherein the hierarchical metadata further comprises cross-object masking such that one of the audio object files that is not masked has priority over one of the audio object files that is masked.

8. A post-encoding bitrate reduction system, comprising:
   one or more scalable bitstream encoders for separately encoding a plurality of audio object files to obtain a plurality of encoded audio object files at a plenary bitrate, the one or more scalable bitstream encoders having fine-grained scalability that ranks bits in each data frame of the encoded audio object files in an order of psychoacoustic importance to human hearing;
   a plenary file formed by combining the plurality of separately encoded audio object files at the plenary bitrate together with corresponding hierarchical metadata that includes at least one of the following: (a) a user-defined priority for each of the separately encoded audio object files to rank the files in order of importance to a user such that the user defines one of the audio object files as more important to the user than another one of the audio object files; and (b) cross-object masking such that one of the audio object files that is not masked has priority over one of the audio object files that is masked; and a bit reduction module for
constructing a first scaled compressed bitstream for playback on an embedded device having a processor from the plenary file at a first target bitrate and assigning each and every one of the separately encoded audio object files at least some bits based on the priority such that higher priority files are assigned more bits as compared to lower priority files; and
constructing a second scaled compressed bitstream from the plenary file at a second target bitrate different from the first target bitrate,
wherein both the first target bitrate and the second target bitrate are less than the plenary bitrate, and are obtained from the plenary file without re-encoding the plurality of audio object files.

9. The system of claim 8, wherein the first target bitrate is a maximum bitrate at which the first scaled compressed bitstream will be transmitted.

10. The system of claim 8, wherein each of the plurality of encoded audio object files is persistent and present for an entire duration of the plenary file.

11. The system of claim 8, wherein the bit reduction module further comprises:

a bit-allocation module for
comparing a data frame activity of data frames of each of the plurality of encoded audio files at a selected time period to each other to obtain a data frame activity comparison;
assigning bits to each of the data frames of the encoded audio object files at the selected time period based on the data frame activity comparison and the first target bitrate to obtain a bit allocation for the selected time period; and
scaling down the plenary file by truncating bits of the data frames in accordance with the bit allocation to achieve the first target bitrate and obtain bit-reduced encoded audio object files; and
a multiplexer and bitstream-packer for multiplexing together the bit-reduced audio object files and then packing the bit-reduced audio object files into the first scaled compressed bitstream at the first target bitrate.

12. The system of claim 11, further comprising:
a communication link for transmitting the first scaled compressed bitstream to a receiving device at the first target bitrate; and
a scalable bitstream-decoder at the receiving device for decoding the first scaled compressed bitstream to obtain decoded audio objects.

13. The system of claim 12, further comprising a mixing device at the receiving device for mixing the decoded audio objects and generating an audio objects mix for playback on an embedded device having a processor.

* * * * *